US011353191B2

(12) United States Patent
Bonanomi et al.

(10) Patent No.: US 11,353,191 B2
(45) Date of Patent: Jun. 7, 2022

(54) TUNABLE WHITE ILLUMINATION

(71) Applicant: CoeLux S.r.l., Lomazzo (IT)

(72) Inventors: Simone Bonanomi, Muggiò (IT);
Matteo Molteni, Cassina Rizzardi (IT);
Sandro Usseglio Nanot, Giaveno (IT)

(73) Assignee: CoeLux S.r.l., Lomazzo (IT)

( * ) Notice: Subject to any disclaimer, the term of this patent is extended or adjusted under 35 U.S.C. 154(b) by 0 days.

(21) Appl. No.: 17/050,962

(22) PCT Filed: May 22, 2019

(86) PCT No.: PCT/EP2019/063221
§ 371 (c)(1),
(2) Date: Oct. 27, 2020

(87) PCT Pub. No.: WO2019/224252
PCT Pub. Date: Nov. 28, 2019

(65) Prior Publication Data
US 2021/0108778 A1    Apr. 15, 2021

(30) Foreign Application Priority Data
May 24, 2018   (IT) .................. 102018000005680

(51) Int. Cl.
*G02F 1/1334*  (2006.01)
*F21V 5/00*    (2018.01)
(Continued)

(52) U.S. Cl.
CPC .............. *F21V 5/002* (2013.01); *G02B 27/30* (2013.01); *G02F 1/1334* (2013.01);
(Continued)

(58) Field of Classification Search
CPC ...... F21V 5/002; F21V 14/003; F21V 7/0091; F21V 7/28; F21V 9/02; F21V 9/40;
(Continued)

(56) References Cited

U.S. PATENT DOCUMENTS

2009/0027891 A1* 1/2009 Hikmet .................. G02F 1/29
                                                         362/296.02
2011/0204805 A1   8/2011 Li et al.
(Continued)

FOREIGN PATENT DOCUMENTS

WO   WO-0219018 A1 *  3/2002   ........... G02F 1/1334
WO   2005101445 A1    10/2005
(Continued)

OTHER PUBLICATIONS

Arthur Thibaut, European International Searching Authority, International Search Report and Written Opinion, corresponding PCT Application No. PCT/EP2019/063221, dated Jul. 15, 2019, 18 pages total.

(Continued)

*Primary Examiner* — Donald L Raleigh
(74) *Attorney, Agent, or Firm* — DiBerardino McGovern IP Group LLC

(57) ABSTRACT

The present disclosure is directed to an illumination device for providing a divergent illumination. The illumination device comprises a light source for emitting light in a visible spectrum; an output aperture, through which the light emitted from the light source exits the illumination device; and a layer structure. The layer structure comprises a scattering layer of a plurality of nanoscale scattering elements embedded in a host material and is positioned in an optical path of the emitted light that extends between the light source and the output aperture. The layer structure comprises further a pair of areal electrical contact layers, wherein the areal electrical contact layers extend at opposite sides of the scattering layer and are electrically connectable with a power source to generate an electric field across the scattering layer. The divergent illumination provided by the illumination device is characterized by at least one luminous (Continued)

intensity distribution curve having the full width at half maximum of at least 10°.

22 Claims, 15 Drawing Sheets

(51) Int. Cl.
*G02B 27/30* (2006.01)
*F21Y 105/10* (2016.01)
*F21Y 115/10* (2016.01)

(52) U.S. Cl.
CPC ....... *F21Y 2105/10* (2016.08); *F21Y 2115/10* (2016.08); *G02B 2207/101* (2013.01)

(58) Field of Classification Search
CPC .............. G02B 27/30; G02B 2207/101; G02B 5/0242; G02B 5/0257; G02F 1/1334; G02F 1/133609; G02F 1/133614; G02F 2203/03; F21Y 2105/10; F21Y 2115/10
See application file for complete search history.

(56) References Cited

U.S. PATENT DOCUMENTS

2015/0316232 A1* 11/2015 Di Trapani ............... F21V 9/02
362/611
2019/0302548 A1* 10/2019 Lee ....................... H01L 27/124

FOREIGN PATENT DOCUMENTS

| WO | 2009156347 A1 | 12/2009 |
|---|---|---|
| WO | 2009156348 A1 | 12/2009 |
| WO | 2014076656 A1 | 5/2014 |
| WO | 2015172821 A1 | 11/2015 |
| WO | 2017084756 A1 | 5/2017 |
| WO | 2018045469 A1 | 3/2018 |
| WO | 2018091150 A1 | 5/2018 |
| WO | 2018157902 A1 | 9/2018 |

OTHER PUBLICATIONS

Arthur Thibaut, European International Searching Authority, International Preliminary Report on Patentability, corresponding PCT Application No. PCT/EP2019/063221, dated Apr. 9, 2020, 9 pages total.

J.H. Oh et al., "Healthy, natural, efficient and tunable lighting: four-package white LEDs for optimizing the circadian effect, color quality and vision performance," Light: Science & Applications (2014) 3, e141; doi:10.1038/lsa.2014.22.

* cited by examiner

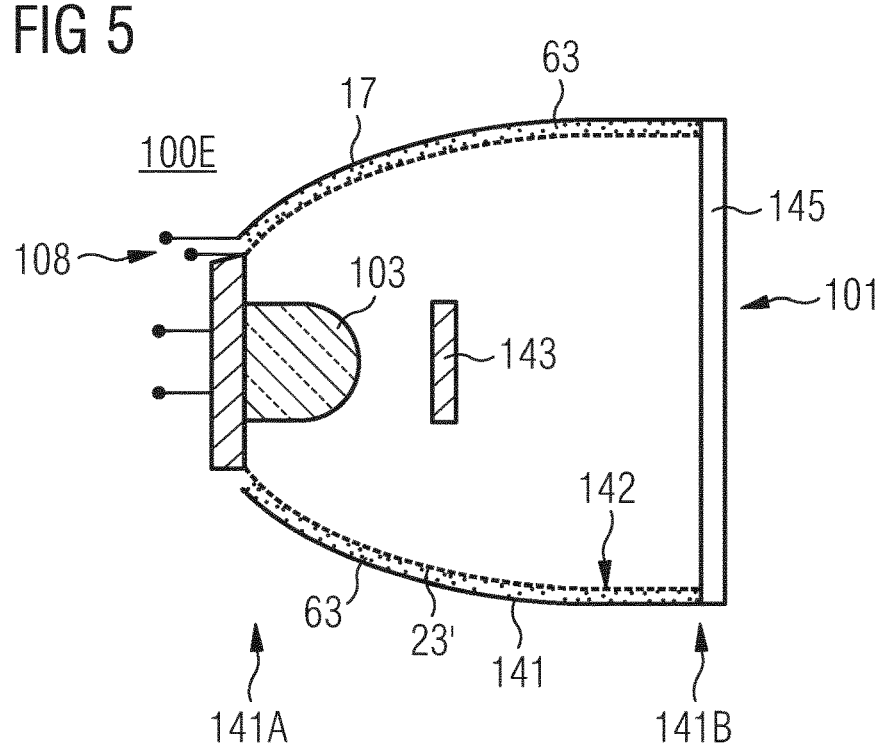
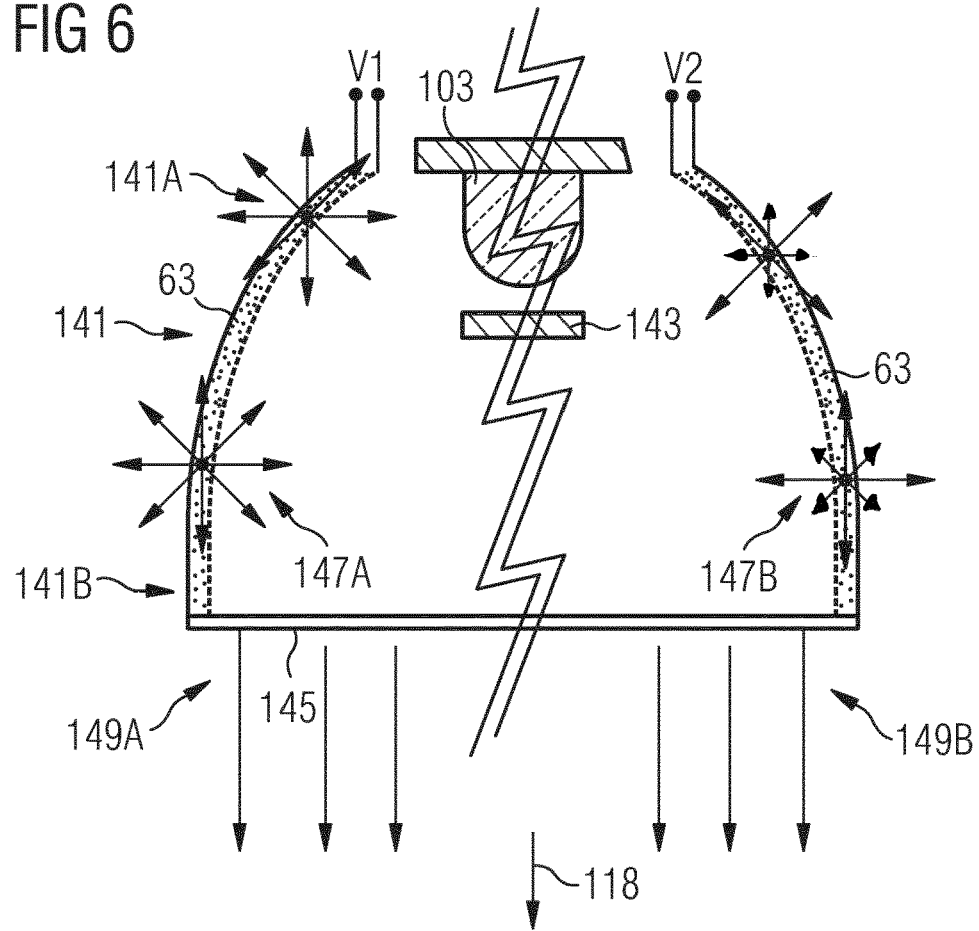

TUNABLE WHITE ILLUMINATION

TECHNICAL FIELD

The present disclosure relates generally to lighting systems, in particular to illumination devices allowing tunable white light illumination.

BACKGROUND

Artificial lighting systems for closed environments often aim at improving the visual comfort experienced by users. One aspect affecting the comfort feeling is the color spectrum of the light used for illumination. LED based tunable white light sources mix colors of a plurality of LEDs to achieve specific color temperatures as disclosed, for example, in US 2011/0204805 A1 as well as in "Healthy, natural, efficient and tunable lighting: four-package white LEDs for optimizing the circadian effect, color quality and vision performance", by J. H. Oh et al., Light: Science & Applications (2014) 3, e141; doi:10.1038/lsa.2014.22. The colors obtainable with those tunable white light sources can be, for example, represented by a straight line (in case of two contributing LEDs) or a triangular area (in case of three contributing LEDs) in a CIE-xy-chromaticity diagram as shown in US 2011/0204805 A1.

Moreover, lighting units are known for simulating natural lighting, specifically sunlight illumination. Such lighting systems can provide dichroic light that is emitted from a light exiting surface. The dichroic light comprises a directional light portion of direct light having a first (lower) correlated color temperature (CCT) and a diffused light portion of diffused light having a second (larger) CCT.

Exemplary embodiments of such lighting systems may use, for example, Rayleigh-like diffusing layers as disclosed in several applications such as WO 2009/156347 A1, WO 2009/156348 A1, WO 2014/076656 A1, and WO 2015/172821 A1 filed by the same applicant. The therein disclosed lighting systems use, for example, a light source producing visible light, and a panel containing nanoparticles used in transmission or reflection. During operation of those lighting systems, the panel receives the light from the light source and acts as a so-called Rayleigh diffuser, namely it diffuses incident light similarly to the earth atmosphere in clear-sky conditions.

In the not-yet published international patent application PCT/EP2017/057062 filed by the same applicant on 24 Mar. 2017 (the entire contents of which is incorporated herein by reference), concepts of a tunable Rayleigh diffuser are disclosed. The tunable Rayleigh diffuser can similarly be used in lighting units for simulating natural sunlight illumination.

As mentioned, the implementations referred to above use nanoparticles that interact with light, due to their nanosize, in the Rayleigh (or Rayleigh-like) scattering regime and are embedded in a host material (surrounding matrix). It is well known from fundamentals of light-scattering that transparent nanoparticles having different refractive index with respect to the matrix, and having sizes (significantly) smaller than visible wavelength, will preferentially scatter the blue part of the spectrum, and transmit the red part. Specifically, the single particle scattering cross-section is given by $$\sigma(\lambda) = \frac{2}{3}\pi^5 \frac{D^6}{n_h^2 \lambda^4}\left(\frac{m^2-1}{m^2+2}\right)^2$$

and an ensemble scattering cross-section amount is given by $$\sigma(\lambda)_{tot} = N \cdot \sigma(\lambda)$$

with N being the number of nanoparticles per unit area (see below).

The optical parameters of the scattering are defined by the size and refractive index of the nanoparticles as well as the number of particles distributed in, for example, a transparent matrix and by the refractive index of that matrix. For nanoparticles, the Rayleigh scattering process depends on three parameters D, m, and N as summarized in the following:

D relates to the size d of the nanoparticles. Specifically, an effective particle diameter $D=d\, n_h$ is considered, where $n_h$ is the refractive index of the host material, and d [meter] is the average particle size over the particles distribution in the case of spherical particles, and as the average thickness of the particles in an assigned propagation direction in the case of non-spherical particles. While the wavelength-dependence of the scattering efficiency per single particle approaches the $\lambda^{-4}$ Rayleigh-limit law for particle sizes smaller or about equal to 1/10 of the wavelength $\lambda$, a respective acceptable optical effect may be reached already in the above range for the size of the nanoparticles, which is often and herein referred to as Rayleigh or Rayleigh-like scattering. On the other side, the scattering efficiency per single particle, proportional to $D^6$, decreases with decreasing particle size, thereby making the use of too small particles inconvenient and requiring a high number of particles in the propagation direction, which in turn may be limited by an achievable filling-fraction.

m relates to the index mismatch of the nanoparticles and the matrix. Specifically, the chromatic effect is based on nanoparticles having a refractive index that is different from the refractive index of the embedding matrix. To scatter, the nanoparticles have a real refractive index $n_p$ sufficiently different from the refractive index $n_h$ of the host material in order to allow light scattering to take place. E.g., the above mentioned prior art systems use a specific solid particle within a specific host material, thereby setting the scattering condition for a fixed ratio $$m = \frac{n_p}{n_h}$$

between the particle and host medium refractive indexes. m is referred to as the relative index of refraction.

N relates to the number of nanoparticles involved in the scattering. Specifically, the chromatic effect is based on the number of nanoparticles per unit area seen by the impinging light propagating in a given direction as well as the volume-filling-fraction f Specifically, the chromatic effect is based on the number N of nanoparticles per unit area that are e.g. embedded in the chromatic diffusive layer.

WO 2005/101445 A1 discloses tunable color conversion cells using as a color converting substance a photoluminescent substance such as fluorescent or phosphorescent dyes that absorb and re-emit light.

WO 2018/045469 discloses a liquid crystal dynamic beam control device that allows controlling the light broadening with a polymer dispersed liquid crystal (PDLC) element that maintains light dispersion quality without introducing intensity or color non-uniformities.

WO 2017/084756 A1 discloses a modular sun-sky-imitating lighting system.

The present disclosure is directed, at least in part, to improving or overcoming one or more aspects of prior systems.

SUMMARY OF THE DISCLOSURE

In a first aspect, the present disclosure is directed to an illumination device for providing a divergent illumination comprising:
- a light source for emitting light in a visible spectrum;
- an output aperture, through which the light emitted from the light source exits the illumination device; and
- a layer structure including
  - a scattering layer of a plurality of nanoscale scattering elements embedded in a host material and positioned in an optical path of the emitted light that extends between the light source and the output aperture, wherein the scattering layer is configured as a polymer dispersed liquid crystal layer with liquid crystals embedded as the nanoscale scattering elements in a host polymer as the host material, wherein the liquid crystals form nanodroplets, are separated by the polymer, and have an anisotropy in the index of refraction, and
  - a pair of areal electrical contact layers, wherein the areal electrical contact layers extend at opposite sides of the scattering layer and are electrically connectable with a power source to generate an electric field across the scattering layer, wherein
- the divergent illumination is characterized by at least one luminous intensity distribution curve having a full width at half maximum of at least 10° and wherein
- a droplet diameter d is in the range from about 10 nm to about 500 nm,
- the liquid crystals has an anisotropy in the range of $0.02 \leq |n_e - n_o| \leq 0.5$, and
- the polymeric host material separating the nanoscale scattering elements has a host refractive index $n_h$ in the range from 1 to 3; and
- wherein the maximizing relative refractive index $\tilde{m}$ is the one among the two values $$\frac{n_o}{n_h} \text{ and } \frac{n_e}{n_h},$$

which maximizes the function $$\left(\frac{m^2 - 1}{m^2 + 2}\right)^2,$$

and
  wherein the droplet size, the host refractive index, and the maximizing relative refractive index, and a constant c define the minimum number N of nanodroplets per unit area of the scattering layer (17) by $$N = c \cdot \frac{n_h^2}{D^6} \left(\frac{\tilde{m}^2 + 2}{\tilde{m}^2 - 1}\right)^2,$$

for the constant c being at least $2.918 \times 10^7$ nm$^4$.

In some embodiments, the droplet diameter d is in the range from about 20 nm to about 400 nm or in the range from about 30 nm to about 300 nm. In some embodiments, the host refractive index $n_h$ is in the range from 1.2 to 2.2 or in the range from 1.25 to 1.75. In some embodiments, the constant c is at least $8.32 \times 10^7$ nm$^4$ or at least $1.6175 \times 10^8$ nm$^4$.

In some embodiments, the constant c is equal to or larger than $5.836 \times 10^7$ nm$^4$ or equal to or larger than $1,664 \times 10^8$ nm$^4$ or equal to or larger than $3.235 \times 10^8$ nm$^4$. In addition or alternatively, the constant c is equal to or smaller than $3.363 \times 10^9$ nm$^4$ or equal to or smaller than $2.5 \times 10^9$ nm$^4$ or equal to or smaller than $1.6499 \times 10^9$ nm$^4$.

In another aspect, the present disclosure is directed to an illumination device for providing a divergent illumination using the Rayleigh or Rayleigh-like scattering regime. The illumination device includes:
- a light source for emitting light in a visible spectrum;
- an output aperture, through which the light emitted from the light source exits the illumination device; and
- a layer structure including
  - a scattering layer of a plurality of nanoscale scattering elements embedded in a host material and positioned in an optical path of the emitted light that extends between the light source and the output aperture, wherein the scattering layer is configured as a polymer dispersed liquid crystal layer with liquid crystals embedded as the nanoscale scattering elements in a host polymer as the host material, wherein the liquid crystals form nanodroplets with a mean size in the range from about 10 nm to about 500 nm, are separated by the polymer, and have an anisotropy in the index of refraction, and
  - a pair of areal electrical contact layers, wherein the areal electrical contact layers extend at opposite sides of the scattering layer and are electrically connectable with a power source to generate an electric field across the scattering layer, wherein
- the divergent illumination is characterized by at least one luminous intensity distribution curve having a full width at half maximum of at least 10°.

In another aspect, the present disclosure is directed to an illumination device for providing a divergent illumination comprising:
- a light source for emitting light in a visible spectrum;
- an output aperture, through which the light emitted from the light source exits the illumination device according to an output direction; and
- a layer structure comprising
  - a scattering layer of a plurality of nanoscale scattering elements embedded in a host material and positioned in an optical path of the emitted light that extends between the light source and the output aperture, and
  - a pair of areal electrical contact layers, wherein the areal electrical contact layers extend at opposite sides of the scattering layer and are electrically connectable with a power source to generate an electric field across the scattering layer, wherein the divergent illumination is characterized by at least one luminous intensity distribution curve having a full width at half maximum of at least 10°.

In some embodiments, the light source is configured to emit light with at least one luminous intensity distribution curve having a full width at half maximum of at least 10°, in particular as the basis of the at least one luminous intensity distribution curve of the divergent illumination of the illumination device. In some embodiments, the light source may emit diffuse light that has an essentially Lambertian luminous intensity distribution, directly towards the layer structure. In addition or alternatively, the layer structure may include a diffusing layer to diffuse the light from the light source to generate at least one luminous intensity distribution curve having the full width at half maximum of at least 10°, in particular as the basis of the at least one luminous intensity distribution curve of the divergent illumination of the illumination device.

In some embodiments, the illumination device may further include a collimation optics configured for redirecting at least part of the light emitted from the light source through the output aperture, and where the collimation optics is optionally configured to generate at least one luminous intensity distribution curve having the full width at half maximum of at least 10°, in particular as the basis of the at least one luminous intensity distribution curve of the divergent illumination of the illumination device.

In some embodiments, a direction, in which the output luminous intensity of the light exiting the output aperture is maximal, may define an output direction, and the collimation optics may include a total active area, that is defined by a projection of surface(s) and/or interface(s) interacting with the light of the light source onto a plane extending transversal to the output direction, that is at least 0.3, at least 0.5, or even at least 0.7 times an assigned area of the output aperture, that is defined by a projection of the output aperture or the portion of the output aperture associated with the respective collimation optics onto a plane extending transversal to the output direction.

In some embodiments, the layer structure, and in particular the scattering layer, may be provided on a transmitting or reflecting surface or interface of the collimation optics, the light source, or an optical window in particular covering the output aperture. In some embodiments, the layer structure may be a film or a coated layer.

In some embodiments, at least one of the areal electrical contact layers may be configured to be transparent in the visible wavelength range. Alternatively or additionally, one of the areal electrical contact layers may be configured to be reflective. It may in particular form a reflective interface of the collimation optics.

In some embodiments, the illumination device may be configured such that the light downstream the output aperture includes a direct light beam including light propagating within an angular range given by the full width at half maximum of the luminous intensity distribution curve of the divergent illumination of the illumination device and/or defined by the collimation optics, and diffuse light originating from scattering of the light emitted from the light source at the nanoscale scattering elements of the scattering layer.

In some embodiments, the scattering layer may have a wavelength dependent ensemble light scattering cross-section amount within the visible wavelength range that depends on a relative refractive index between the nanoscale scattering elements and the host material associated to an illumination direction. The scattering layer may be configured to be adaptable in the ensemble light scattering cross-section amount by setting a strength of the electric field, thereby varying the relative refractive index and/or thereby in particular providing a changeability in the spectra of the direct light beam portion and the diffuse light portion.

In some embodiments, the light source may include at least one light-emitting diode mounted on an LED-boar, and/or the light source may include a 1D or 2D array of light-emitting diodes.

In some embodiments, the collimation optics may be configured to redirect the light of the light source by reflection at a reflective surface, and the collimation optics may include a total-internal reflection-lens or a compound parabolic concentrator, having in particular a rectangular or circular cross-section.

In some embodiments, the illumination device may further include a controllable power unit that is electrically in contact with the pair of areal electrical contacts, and that is configured to adapt the electrical field across the scattering layer, thereby controlling the ensemble light scattering cross-section amount.

In some embodiments, the liquid crystal droplets dispersed in the transparent host material may be provided to act as scattering centers in a nanosize range for Rayleigh-like scattering.

In some embodiments, the liquid crystal droplets dispersed in the transparent host material may be provided to act as transparent nanoscale scattering elements in the Rayleigh or Rayleigh-like scattering regime.

In some embodiments of the illumination device, an output aperture of the illumination device is given by an area from which light exits the illumination device. Then, a dimension of the output aperture may be given, for a circular output aperture, by a diameter being smaller than 95 mm, such as less than 80 mm, or even less than 50 mm. For a non-circular output aperture, a dimension of the output aperture may be given by a diameter of a circle encompassing the output aperture being smaller than 95 mm, such as less than 80 mm, or even less than 50 mm.

In some embodiments, an output aperture of the illumination device is given by an area from which light exits the illumination device. Then, the output aperture may extend over an area smaller than or equal to 10000 mm2, smaller than or equal to 9000 mm2, or smaller than or equal to 6400 mm2, or even smaller than or equal to 2500 mm2.

In some embodiments, the scattering layer have a wavelength dependent ensemble light scattering cross-section amount within the visible wavelength range that depends on an effective size of the nanoscale scattering elements associated to an illumination direction. The scattering layer may then be configured to be adaptable in the ensemble light scattering cross-section amount by setting a strength of the electric field, thereby varying the effective size of the nanoscale scattering elements (19, 63) and/or thereby in particular providing a changeability in the spectra of the direct light beam portion and the diffuse light portion.

Generally, herein light in the visible spectrum is considered to be in the wavelength range from 400 nm to 700 nm. Usually, the light source generates light from electric power. In some embodiments, the light source receives (optionally additionally) light via a light guide such as an optical fiber. Respective light receiving and light guiding systems are disclosed, for example, in the not-yet published international patent application PCT/EP2017/000272 filed by the same applicant on 28 Feb. 2017 (the entire contents of which is incorporated herein by reference). In the latter case, the light source can be considered, for example, to be the fiber output face.

The light source should preferably satisfy one or more of the following features for the emitted light: correlated color temperature: CCT>4000 K, preferably >5000 K, more preferably 5500 K; color rendering index: CRI>80, preferably >85, more preferably >90; Luminance: $L>10^4$ cd/m$^2$, preferably >$10^5$ cd/m$^2$, more preferably >$10^6$ cd/m$^2$.

The output aperture of the illumination device is an area from which light exits the illumination device. For a collimation optics extending essentially up to an output window or up to an output opening of a housing, the output aperture is essentially defined by the perimetral edge of the collimation optics (or the projection thereof onto the exit window). When the light exiting the illumination device is delimited in its cross-sectional size by an output opening of a housing, the output aperture is essentially defined by the perimetral edge of the opening. Usually, a planar optical output window embodies the area of the output aperture and closes the output opening of the housing. For more complex housing structures, the output aperture can be associated with a plane fitted best into the output opening.

An output direction is associated with a main direction of the light exiting the output aperture. In the output direction, the output luminous intensity is maximal. The output direction extends usually in a direction orthogonal to the output window, generally the output aperture, unless a specifically inclined output is intended. In some embodiments, the output direction corresponds to an angle with respect to a direction orthogonal to a plane defined by the output aperture that is smaller than 45°, preferably smaller than 35°, most preferably smaller than 25°.

The herein disclosed aspects relate to illumination devices that provide a divergent illumination. Herein, a divergent illumination can be described with respect to a reference direction, herein also referred to as the output direction of the illumination device. The reference (output) direction corresponds usually to the direction of maximum luminous intensity of a luminous intensity distribution associated with the illumination device. A divergent illumination can be represented by a curve of the luminous intensity distribution in at least one section plane comprising the reference/output direction and passing through the geometrical center of the output aperture. Generally, the curve represents the luminous intensity in a plane that passes through the light source or the geometrical center of the output aperture or the exit window in case the geometrical and optical association of the luminous intensity distribution is primarily linked to the output aperture. The luminous intensity is represented as a function of the angle measured from some given direction, usually the output direction. The luminous intensity distribution has a FWHM (full width at half maximum) of at least 10°, e.g. 15° or more, 20° or more, 30° or more, 40° or more, 50° or more such as 60° or more around the output direction.

The output direction can correspond to a collimation direction associated with the collimation optics. For an LED panel based system, the output direction can be orthogonal to a plane defined by the LED panel.

A divergent illumination distinguishes from a narrow collimated light beam that can be used to imitate the sun in the initially mentioned publications. Light of the divergent illumination exits the output aperture in an angular range around the output direction.

A divergent illumination can be generated by collimating light of a diffuse emitting light source only to a respective (limited) extent. Moreover, a divergent illumination can be generated by broadening a light beam by (broad band) diffusion e.g. in a diffusing layer/interface. The diffusing layer/interface may be a rough surface structure or be based on diffuse scattering (large) particles within a scattering layer.

The limit of divergent illumination is a (completely) diffuse light emission such as light being emitted with an essentially Lambertian luminous intensity distribution.

As said, the divergent illumination may differ with respect to differing azimuthal directions (e.g., different planes extending through the output direction), while in particular the divergence in any azimuthal direction fulfills a minimum FWHM of at least 10°, e.g. 15° or more, 20° or more, 30° or more, 40° or more, 50° or more such as 60° or more.

In contrast to sun-sky-imitating lighting systems, the herein disclosed illumination devices do not intend to imitate a sun appearance. Instead, the spectral composition of the diffuse illumination is of primary interest. The herein proposed diffuse illumination will result in the perception of a large bright spot usually covering the complete output aperture.

For that reason, also output apertures of a small size (compared to the large sky imitating panels) can be used that would not allow the appearance of a sun surrounded by sky when looking at it, just due to the limited (small) size of the output aperture. Then, even output apertures of small size may be used in combination with non-divergent small illumination spots. Thus, while the divergence in any azimuthal direction may then fulfill alternatively also a minimum FWHM of less or equal than 10°, e.g. 8° or 5° or 3° (herein considered as non-divergent illumination), the dimension of the output aperture can be characterized by a diameter being smaller than 95 mm, such as less than 80 mm, or even less than 50 mm for a circular output aperture. For non-circular output apertures, a diameter of a circle encompassing the output aperture (or encompassing the total active area of the collimation optics) may be used to define the dimension of the output aperture. Defined by areal dimensions, the output aperture may extend over an area smaller than or equal to 10000 mm2, smaller than or equal to 9000 mm2, or smaller than or equal to 6400 mm2, or even smaller than or equal to 2500 mm2.

In general, embodiments providing a more divergent illumination may have an output aperture of larger size. E.g., a diffuse LED panel may have a size of several 100 mm in one or two directions.

It is noted that an internal surface of the housing of the lamp may be non-absorbing in at least a portion that corresponds to at least 30%, preferably 20% and more preferably 10% of the internal surface. That means, that in contrast to the above mentioned lighting units optimized for simulating natural sunlight illumination, back reflections of light from the ambience need not to be canceled by providing specific absorbing structures. Instead, any light (at least some portion) entering into the illumination device may be reflected back out again, be it by the collimation optics or any reflective portion of the internal surface of the housing.

The illumination device can have a light emission having a first CCT in the output direction and a second CCT in a direction inclined by an angle greater or equal than 80° (preferably greater or equal than 70°, more preferably greater or equal than 60°) with respect to the output direction, and the second CCT is larger than the first CCT.

In contrast to the initially mentioned tunable white light sources, which use a plurality of light sources characterized by different CCTs or different colors by mixing the brightness of each of those light sources for color tuning, the herein disclosed illumination devices use a scattering layer that is controllable in the way light is scattered. The tunable scattering layer allows a more natural tunability of colors. The tunable scattering layer can in particular allow color tuning along a curved line close to the line of the Planckian locus in the CIE-xy-chromaticity diagram, e.g., in the region close to the different color points of the sun and the sky during a clear sunny day.

Moreover, the herein disclosed illumination devices enable a finer color tuning that can be matched with the colors of the sunlight components, be it from the real sun or by a sunlight imitating light source as those disclosed in the above mentioned patent applications as well as those being based on the technology disclosed in the above mentioned not yet published international patent application PCT/EP2017/057062.

As generally a large mismatch between white light sources in a room may be perceived as disturbing, it is desirable to match the color of a sunlight component of a sunlight imitating light source and the color of a supplemental illumination device positioned in the same room as (e.g. next to) the sunlight imitating light source. In particular, the herein disclosed technology enables reproducing a color range similar to the natural illumination such that the herein disclosed concepts may allow following a natural color (reproduction) of sunlight closely and to a large extent over the changing sun illumination during the day.

Further embodiments of the above aspects, are disclosed in the dependent claims, which are incorporated herein by reference.

Further embodiments are disclosed in the dependent claims.

For example, in some embodiments, the scattering layer may have a chromatic tunability range defined by the range of variation in the refractive index mismatch and/or the range of variation in the effective size of the nanoscale scattering elements. The scattering layer may be configured to provide light scattering cross-sections within the chromatic tunability range such that, for a CIE 1931 standard observer (2°), the spectrum of the regularly transmitted light corresponds to a color point in the CIE 1976 u'-v'-chromaticity diagram with u'-v'-coordinates larger than 0.20 and 0.465, respectively, when non-polarized white light with a spectral power distribution that is constant inside the visible spectrum (E standard illuminant) impinges with an incidence angle onto the scattering layer in particular for normal incidence or for a selected one or all incidence angles within the angular range from normal incidence up to an incidence angle of about 45°, 35°, 25° or 15°. The scattering layer may be configured to provide light scattering cross-sections within the chromatic tunability range such that the regular spectral transmittance corresponds to a color point in the CIE 1976 u'-v'-chromaticity diagram with u'-v'-coordinates larger than 0.20 and 0.465, respectively, when measured with non-polarized white light under an incidence angle onto the scattering layer in particular for normal incidence or for a selected one or all incidence angles within the angular range from normal incidence up to an incidence angle of about 20°, 40°, or 60°. The scattering layer may be configured to provide light scattering cross-sections within the chromatic tunability range such that, for impinging white light with a spectral power distribution that is constant inside the visible spectrum (E standard illuminant), the spectrum of the diffuse light, integrated over all the scattering angles except those angles that depart by less than 20° from the regular transmission angle, corresponds to a color point in the CIE 1976 u'-v'-chromaticity diagram with u'-v'-coordinates smaller than 0.22 and 0.485, respectively. The scattering layer may be configured to provide light scattering cross-sections within the chromatic tunability range such that, for impinging white light with a spectral power distribution that is constant inside the visible spectrum (E standard illuminant) and for a CIE 1931 standard observer (2°), the Euclidean distance $\Delta u'v'$ between a color point, which is associated to the spectra of the transmitted light within the chromatic tunability range, or the regular spectral transmittance within the chromatic tunability range, and a color point, which is associated to the respective spectra of the diffuse light, is equal to or greater than 0.02, in particular even equal to or greater than 0.03, or even equal to or greater than 0.04, or even equal to or greater than 0.05.

In some embodiments, the Euclidean distance $\Delta u'v'$ for at least one color point, which is associated to the spectrum of the regularly transmitted light or the regular spectral transmittance within the chromatic tunability range, and the Planckian locus may be equal to or smaller than 0.1, in particular even equal to or smaller than 0.08, or even equal to or smaller than 0.05, or even equal to or smaller than 0.03, or even equal to or smaller than 0.01.

For the configuration within the chromatic tunability range, which corresponds to the maximum scattering cross-section, for a CIE 1931 standard observer (2°), the regularly transmitted light or the regular spectral transmittance may correspond to a color point in the CIE 1976 u'-v'-chromaticity diagram with u'-v'-coordinates greater than 0.20 and 0.465, respectively, such as greater than 0.2117 and 0.4851, respectively, or even greater than 0.212 and 0.485, respectively, or even greater than 0.225 and 0.5, respectively, or even greater than 0.2265 and 0.5029, respectively, or even greater than 0.24 and 0.514, respectively, or even greater than 0.243 and 0.5166, respectively, or even greater than 0.2598 and 0.5261, respectively, when non-polarized white light with a spectral power distribution that is constant inside the visible spectrum (E standard illuminant) impinges with an incidence angle onto the scattering layer in the range from normal incidence up to an incidence angle of about 60°. In addition or alternatively, for the configuration within the chromatic tunability range, which corresponds to the maximum scattering cross-section, for a CIE 1931 standard observer (2°), the regularly transmitted light or the regular spectral transmittance may correspond to a color point in the CIE 1976 u'-v'-chromaticity diagram with a u'-coordinate smaller than 0.465, such as smaller than 0.42 or 0.4, in particular smaller than 0.38 or 0.3605, or even smaller than 0.35.

In some embodiments, the wavelength dependent light scattering cross-section is given by a specific selection of properties of the scattering layer, which affect its optical properties, including: a refractive index of the nanoscale scattering elements, in particular an anisotropy in the refractive index and/or a refractive index of constituting matter of the nanoscale scattering elements, a size and/or a shape of the nanoscale scattering elements, in particular an anisotropy in the geometric shape, a refractive index of the host material, in particular an anisotropy in the refractive index and/or a refractive index of constituting matter of the host material, a filling ratio between the nanoscale scattering elements and the host material, and/or a layer thickness of the scattering layer. In some embodiments, a mean size of the nanoscale scattering elements may be in the range from about 10 nm to about 500 nm such as in the range from about 20 nm to about 400 nm such as in the range from about 30 nm to about 300 nm, and/or a volume fraction between the nanoscale scattering elements, in particular between liquid crystal droplets, and the host material may be in the range from about 15% to about 70% such as in the range from about 25% to about 60% (e.g. 30% or 25%), and/or a layer thickness of the scattering layer may be in the range from about 5 μm to about 500 μm such as in the range from about 10 μm to about 250 μm, e.g. in the range from about 15 μm to about 125 μm or even in the range from about 20 μm to about 50 μm, and optionally the layer thickness is defined by spacer elements and/or has a variation in thickness less than 10% across an area of 5 cm×5 cm (or e.g. 10 cm×10 cm) of the scattering layer.

In some embodiments, the constant c is equal to or larger than $5.836 \times 10^7$ nm$^4$, in particular equal to or larger than $1.664 \times 10^8$ nm$^4$, such as equal to or larger than $3.235 \times 10^8$ nm$^4$. Moreover, in some embodiments, the constant c is equal to or smaller than $3.363 \times 10^9$ nm$^4$, in particular equal to or smaller than $2.5 \times 10^9$ nm$^4$, such as equal to or smaller than $1.6499 \times 10^9$ nm$^4$.

In some embodiments, the optical parameters of the scattering layer may be selected such that without an applied electric field, the white light passing through the scattering layer is separated in a warmer direct light portion (in particular having a lower CCT—herein considered as the light within the full width at half maximum of the luminous intensity distribution) and a colder diffused light portion (in particular having a higher CCT, e.g. at least 1.1 times, preferentially 1.2 times, more preferentially 1.5 times more than the lower CCT—herein considered to be outside that full width at half maximum of the luminous intensity distribution).

In some embodiments, the wavelength dependent light scattering cross-section in the blue (such as in the wavelength interval 440 nm to 460 nm) may be larger than in the yellow (such as in the wavelength interval 540 nm to 560 nm), in particular it may be at least about 15%, such as at least about 30% larger. Moreover, the wavelength dependent light scattering cross-section in the yellow (such as in the wavelength interval 540 nm to 560 nm) may be larger than in the red (such as in the wavelength interval 640 nm to 660 nm), in particular it may be at least about 10%, such as at least about 20% larger. Moreover, the wavelength dependent light scattering cross-section may decreases with increasing the wavelength, e.g. it decreases monotonically when increasing the wavelength ($\sigma(\lambda_1) < \sigma(\lambda_2)$ for $\lambda_1 > \lambda_2$).

In some embodiments, the lighting system may comprise a control unit to control the power unit and adapt a strength of the electrical field generated by the electric field generator, thereby in particular controlling the light scattering cross-section and any variation of it. The strength of the electrical field can be adapted by varying the amplitude and/or the duty cycle of the power signal generated by the power unit.

For completeness it is referred to another embodiment that provides for a chromatically tunable scattering interaction onto impinging white light with a plurality of nanoscale scattering elements that are geometrically asymmetric, in particular rod-like/elongated, in shape and provide an, in particular induced, dipole moment in the presence of an electric field. The asymmetric scattering elements are provided in a liquid-like host material layer, wherein the liquid-like host material differs in the refractive index from the refractive index of the nanoscale scattering elements, separates the nanoscale scattering elements, and allows reorientation of the nanoscale scattering element. A pair of areal electrical contacts may provide the electric field for interacting with the nanoscale scattering elements within the liquid-like host material layer. For further details it is in particular referred to the above mentioned not yet published international patent application PCT/EP2017/057062, specifically the disclosure related to the embodiments discussed in connection with FIGS. 13 and 14, incorporated herein by reference.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 5 is a schematic cross-section of a fifth embodiment of an illumination device;

FIG. 6 is an illustration of the tunable scattering of the fifth embodiment;

DETAILED DESCRIPTION

Figure 1A:
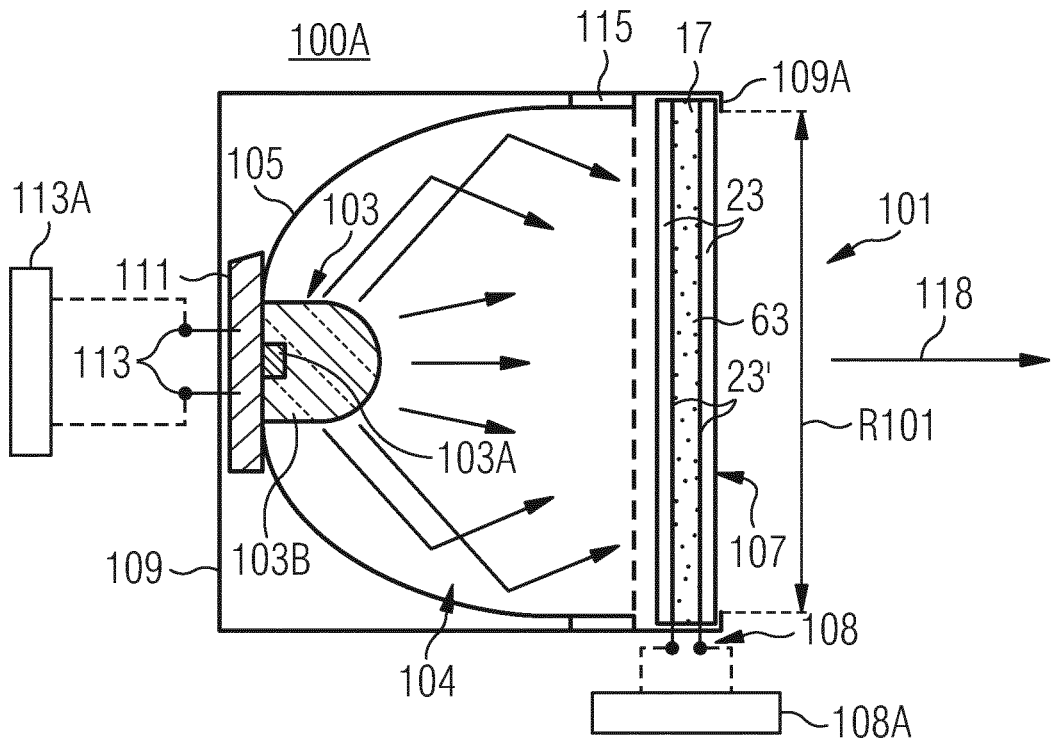
FIGS. 1A and 1B are a schematic cross-section and a front view, respectively, of a first embodiment of an illumination device.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that using the herein disclosed tunable Rayleigh-scattering concept, one can tune the color of the white light illumination in a natural manner. In particular, one can operate white light secondary illumination devices in line with a natural/imitated sunlight beam as it would be perceived for e.g. different times of the day. It was realized that the change in color allows illuminating a room in a consistent manner with respect to day light. In other words, the tuning of the transmittance enables a tunable illuminance profile that allows setting a desired consistency of the illuminance provided by several lighting system used to illuminate a room.

The disclosure is further based in part on the realization that an anisotropy in the refractive index allows varying the relative refractive index m that contributes to Rayleigh or Rayleigh-like scattering.

Moreover, it was realized that introducing, for example, liquid crystal based structures provides access to a tunability of the transmittance of such a layer structure due to changes in a scattering parameter within a large range, thereby being able to tune (set/adapt) the scattering parameter to a plurality of values (i.e. at least two different scattering conditions). For example, it was realized that using liquid crystal droplets dispersed in a solid transparent host material as scattering centers in a nanosize range (e.g. for Rayleigh-like scattering), one can set a contributing relative index of refraction by changing the voltage applied across the liquid crystal droplets. Specifically, applying an electric field aligns the liquid crystal orientations within distinct nanodroplets to some extent.

Moreover, it was realized that a polymer dispersed liquid crystal (PDLC) layer can be created with a homogeneous thickness of e.g. less than 500 μm such as 300 μm, or even less than 200 μm down to less than 100 μm or even less than 50 μm, e.g., having a homogeneity of less than 10% across 10 cm of the lateral dimensions of the PDLC layer.

It was further realized that the anisotropy in refractive index may be used in reverted configurations in which e.g. static scatterer optical conditions are used within an adaptable host refractive index.

The skilled person will acknowledge those optical aspects as well as those aspects of the implementations disclosed herein that can be broadly applied and understood for varying conditions, implementations, and/or applications. Thus, targeting an at least to some extent condense disclosure, specific aspects are illustrated in more detail within one condition, implementation, and/or application, knowing that the skilled person will appreciate suitable transfer and equal applicability in another condition, implementation, and/or application.

In connection with FIGS. 1 to 10, exemplary schematic embodiments of illumination devices are described, which emit light originating from a white light source through an output aperture. The embodiments include an implementation of a layer structure that is positioned in an optical path of the emitted light that extends between the light source and the output aperture. The layer structure, thus, may be in at least a portion of the various optical paths of emitted light rays propagating from the light source to the output aperture, thereby influencing the spectral characteristics of the emitted light. For example, the layer structure can be a separate optical panel or a layer (such as a film) applied to an optical element (e.g., an output window or a reflective element). The embodiments may further include reflective collimation optics (see, e.g., FIGS. 1A, 3A, 5) or refractive collimation optics to collimate the emitted light at least partly (see, e.g. FIGS. 9 and 10).

Figure 1B:
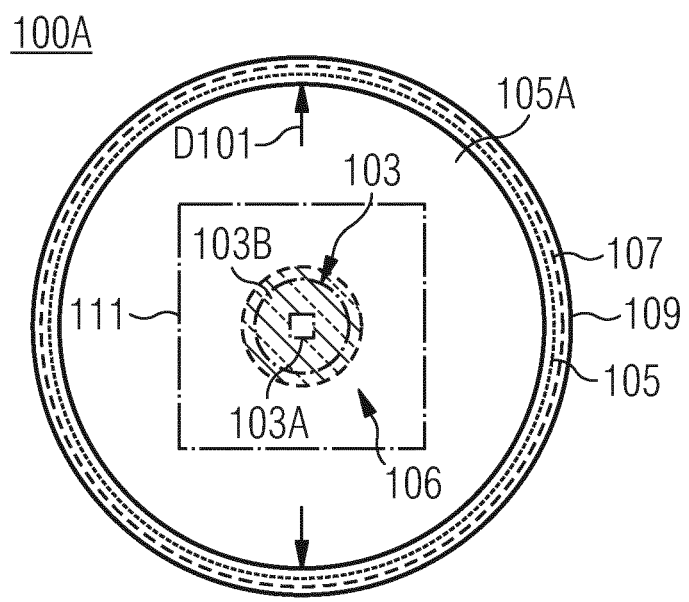

FIG. 1A shows a schematic cross-section of a first exemplary embodiment of an illumination device 100A that is configured to emit a light beam through an output aperture 101. The light beam comprises light propagating within an angular range given by the full width at half maximum of the luminous intensity distribution curve of the divergent illumination of the illumination device and is, for example, defined by the collimation optics. FIG. 1B illustrates a respective schematic front view of the illumination device 100A.

The illumination device 100A comprises a light source 103, a collimation optics 105, and a layer structure 107.

The layer structure 107 is configured as an output window of the illumination device 100A. It comprises a scattering layer 17 and a pair of electrical contact layers 23' (or short electrical contacts). The scattering layer 17 is, for example, sandwiched between two ITO glass sheets 23 to provide stability and protection to the scattering layer 17. Further embodiments of layer structures suitable for the present embodiment are described below in particular in combination with FIGS. 17A to 17D and 17G to 17J.

Via the scattering layer 17, and in particular by generating an electric field across the scattering layer 17 applied at tuning electrodes 108, the illumination device 100A can be tuned in a color spectrum associated with the emitted light beam. For the function of the scattering layer 17, it is referred to the description below in connection with FIGS. 2A and 2B as well as the description in connection with FIGS. 12 to 19.

Illumination device 100A further comprises a housing 109, which encloses in particular the light source 103, the collimation optics 105, and the layer structure 107 (except for the output aperture 101). Thereby, illumination device 100A forms a single structural unit. The single structural unit can be used itself as a luminaire or it can be used within a luminaire as a light engine module (see also FIGS. 11A and 11B).

The light source 103 is mounted to a power supplying board 111 that has electrical contacts 113 for connecting the light source 103 to a (light engine) power source 113A. Optionally, the board 111 carries control electronics for operating, e.g., semiconductor-based light-emitting structure of the light source 103. The semiconductor-based light-emitting structure may comprise one or more LEDs. A single LED 103A is exemplary illustrated in FIG. 1B. The light source 103 is configured to emit white light, e.g., covering a spectral range from about 400 nm to about 700 nm. For example, LED 103A may be a broadband white light source/LED, e.g. comprising a light converting phosphor layer.

The light source 103 may further comprise a primary collimating (dome) lens 103B that is schematically indicated in FIG. 1A. The dome lens 103B collects in a first step e.g. the converted light originating from the phosphor. Light exits the dome lens 103B in a large angular range as indicated by arrows 104 in FIG. 1A. Some portion of the light will directly propagate towards the output aperture 101 and exit the illumination device 100A.

Another portion of the light will impinge on the collimation optics 105. In the exemplary embodiment of FIG. 1A, the collimation optics 105 is a reflective collimator such as a circular compound parabolic concentrator (CPC). FIG. 1B illustrates the circular shape of the circular CPC. The collimation optics 105 redirects the incident light (specifically the light originating from the light source 103) towards the output aperture 101.

The light exiting through the output aperture 101 (assuming at this stage no interaction with the scattering layer) forms essentially a light beam. The light beam is characterized by an output luminous intensity distribution. The light propagation direction with the largest output luminous intensity defines an output direction 118 (schematically indicated in FIG. 1A as an arrow, due to symmetry in this case orthogonal to the plane of the output aperture 101). Depending on the collimation optics 105, the light beam has a full width half maximum in at least one output luminous intensity distribution curve in the range from 5° to 60° or more, e.g. 10°, 20°, 30°, 40°, 50°, or 60°. The output direction is generally associated with the main direction of the light beam, even if the beam is not that collimated.

The collimation optics 105 may be attached to board 111 and, via the board 111, to the housing 109. FIG. 1A further illustrates a, for example, ring-shaped mounting structure 115 for stabilizing the CPC at its aperture side with respect to the housing 109.

Defining a projection of the optically active area (i.e., the area of the collimation optics 105 that reflects light coming from the light source 103) onto a plane extending transversal to the output direction 118 at the output aperture 101 as a total active area 105A, then the collimation optics comprises a total active area 105A extending ring-shaped between the two dashed ring lines in FIG. 1B. In other words, with the exception of a central circular region 106 (shaded), the total active area 105A would extend essentially radially as far as the output aperture 101, a diameter D101 of the output aperture 101 is indicated in FIGS. 1A and 1B.

Generally, the collimation optics 105 can be considered to comprise a total active area that is defined by a projection of surface(s) and/or interface(s) interacting with the light of the light source onto a plane extending transversal to the output direction. That total active area is at least 0.3, at least 0.5, or even at least 0.7 times an assigned area of the output aperture 101 that is associated with the respective collimation optics 105 and that is defined by a projection of the output aperture 101 or the portion of the output aperture associated with the respective collimation optics 105 onto a plane extending transversal to the output direction 118.

FIG. 1B illustrates further the circular shape of the output aperture 101. The output aperture 101 is limited exemplarily by a circular holding bracket 109A of housing 109.

Figure 2A:
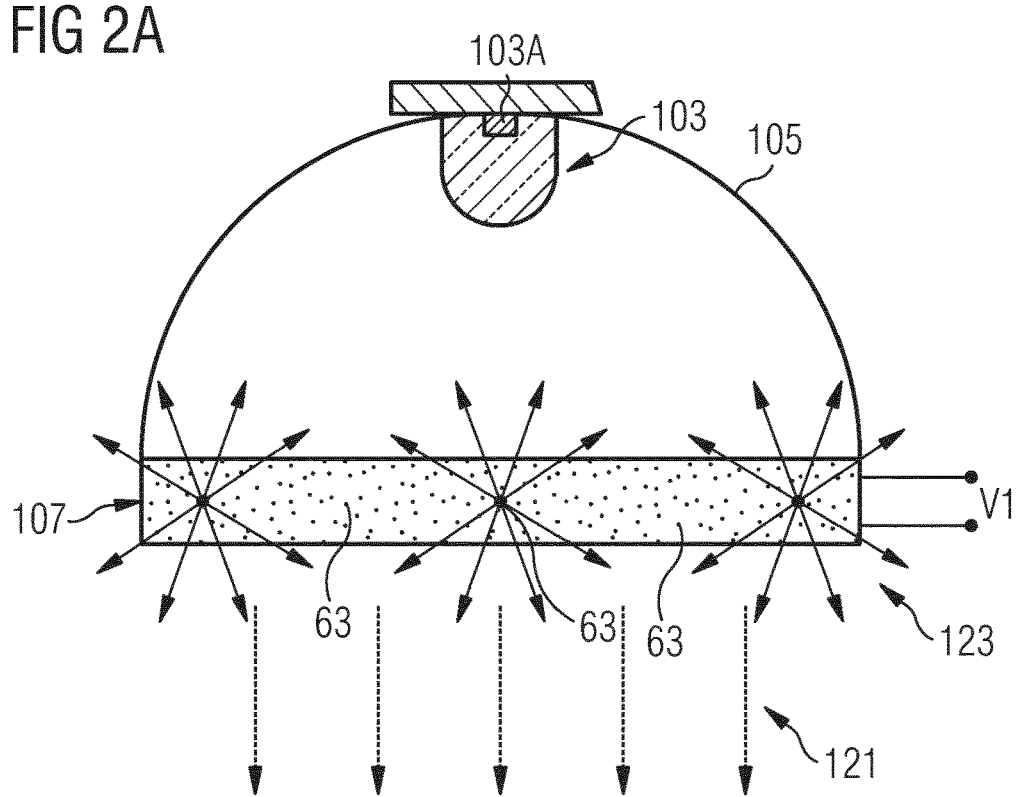
FIGS. 2A and 2B are illustrations of the tunable scattering of the first embodiment.
Figure 2B:
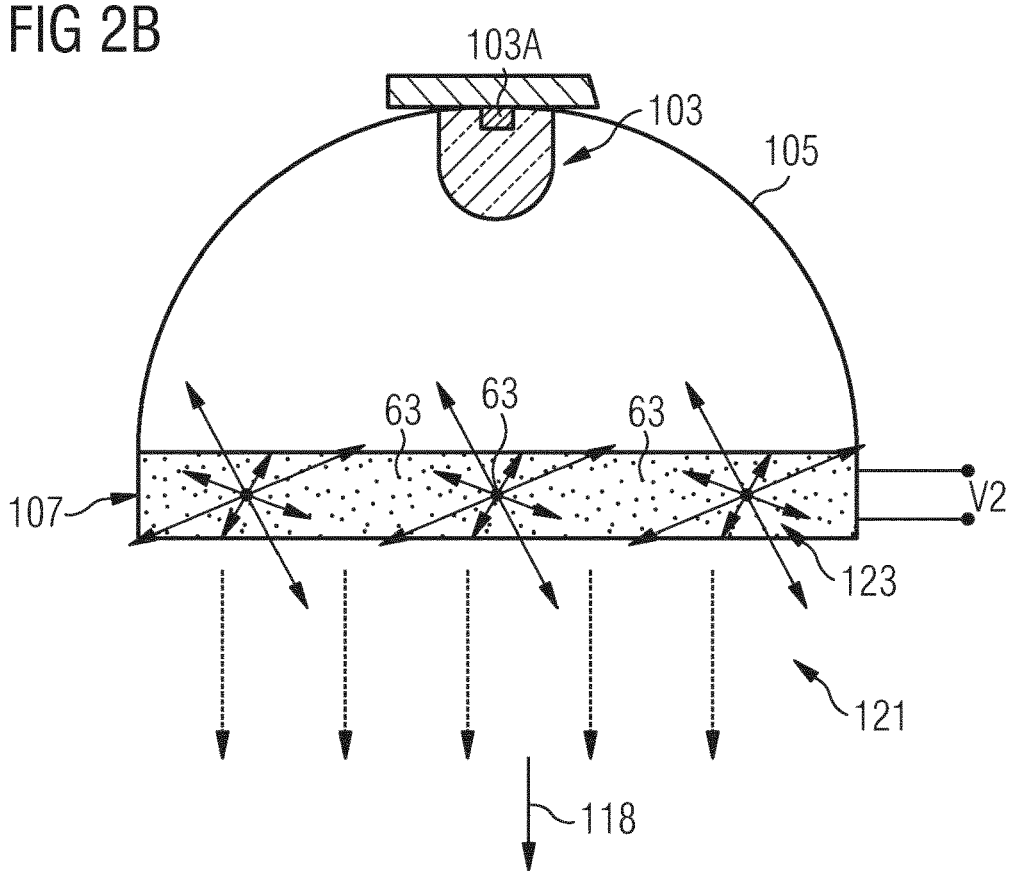

FIGS. 2A and 2B schematically illustrate the effect of the scattering layer 17 on the appearance of the emitted light beam, specifically its perceived color. For influencing the scattering properties of the scattering layer 17, the pair of areal electrical contact layers 23' are electrically connected via the tuning electrodes 108 with a (scattering control) power source 118A to generate an adjustable electric field 27 across the scattering layer 17.

In a 1st operation state (for example, no electric field is applied in FIG. 2A—voltage value V1=0), the scattering condition is set such that a broad spectral range of the light emitted from the light source 103 is highly scattered. Accordingly, an emitted light beam 121 appears reddish (e.g., when looked at from within an angular range given by the full width at half maximum of the luminous intensity distribution curve of the divergent illumination of the illumination device), while scattered light 123 (viewable from the side only) appears white. The scattering of a broad spectral range is indicated in FIG. 2A by many scattering arrows at selected scattering elements 63.

In a 2nd operation state (for example, where a preset electric field is enforced across the scattering layer 17 in FIG. 2B—voltage value V2), the scattering condition is set to have low scattering. Then, the light beam 121 appears yellowish, while scattered light 123 appears bluish. The scattering of primarily the blue spectral range is indicated in FIG. 2B by scattering arrows varying in size at selected scattering elements 63 (small sized arrows symbolizing reduced scattering of, for example, red wavelength components).

Thus, by varying the electric field strength, the spectral appearance of the light beam 121 can be set as a color point within the daylight locus in the CIE-xy-chromaticity diagram that is specific to the scattering properties of the scattering layer 17.

FIGS. 3A, 3B, 4A, and 4B illustrate alternative embodiments of illumination devices 100B, 100C, 100D that are based on a total internal reflection (TIR) lens. In general, the light propagation within the TIR lens is similar to the one illustrated in connection with FIG. 1A (to simplify the drawings, no arrows are shown). Also the aspect of the total active area with respect to the area of the output aperture 101, when projected onto a plane extending transversal to the output direction, is similar to the CPC-embodiment.

Due to the monolithic structure of the TIR lens, the illumination devices 100B, 100C, 100D may be configured as a compact compound optical element, in which all optical elements are fixedly attached to each other. Alternatively, they can be provided with a housing (not shown), mounting one or more of the optical elements as in FIG. 1A.

In the illumination device 100B, the layer structure 107 is positioned as in FIG. 1A at the aperture side and, thus, interacts essentially with the formed collimated light leaving the collimation optics. In contrast, the illumination devices 100C and 100D are exemplary embodiments, in which the layer structure interacts with the light before impinging on the collimation optics.

Figure 3A:
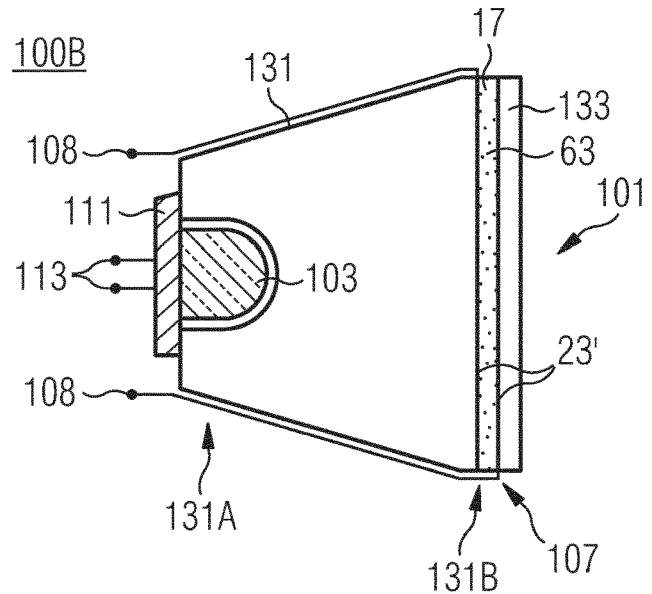
FIGS. 3A and 3B are a schematic cross-section and a front view, respectively, of a second embodiment of an illumination device.

Specifically referring to FIG. 3A, the collimation optics is configured as a TIR lens 131 having an input side 131A and an output side 131B. The TIR lens 131 redirects light emitted from the light source 103 through the output aperture 101 provided at an output side 131B. At an input side 131A, the TIR lens 131 may encompass light source 103. The TIR lens 131 may be mounted to board 111 together with the light source 103. At the output side 131B of TIR lens 131, the layer structure 107 may be configured as a film applied to the output face of the TIR lens 131, together with the two transparent contact layers 23'. The layer structure 107 may further comprise a protective or UV-filtering glass layer 133. As shown in FIG. 3A, tuning electrodes 108 can be guided along TIR lens 131 towards the input side 131A of the TIR lens 131 and connected to a (scattering control) power source (not shown in FIG. 3A).

Figure 3B:
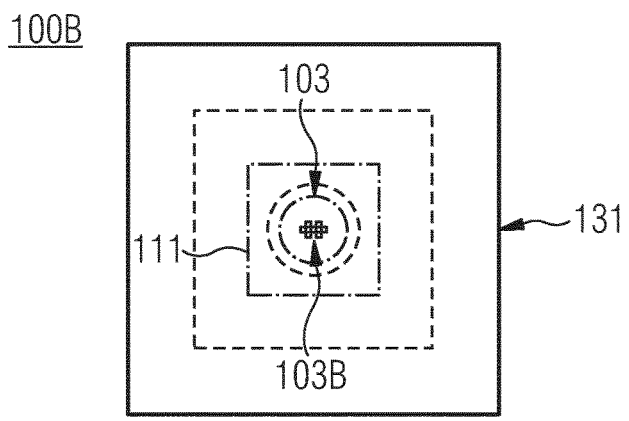

FIG. 3B illustrates exemplarily that the TIR lens 131 has a rectangular output aperture 101. It is noted that other cross-sectional shapes of the TIR lens as well as the CPC of FIG. 1A will be appreciated by the skilled person.

Moreover, FIG. 3B illustrates exemplarily that light source 103 may comprise a plurality of semiconductor-based light emitting structures, e.g., a plurality of LEDs 103B. It is noted that, although in principle color tuning of the white light from such a plurality of LEDs may be used for the initial setting of the spectrum of the light emitted from the light source 103 (e.g. of a plurality of LEDs emitting at different CCTs in order to provide some color tuning), the herein disclosed concepts provide for a color tuning independently from that initial setting.

Figure 4A:
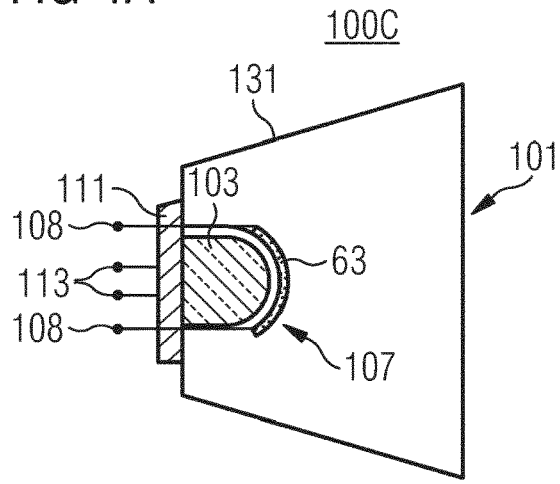
FIGS. 4A and 4B are schematic cross-sections of a third and a fourth embodiment of an illumination device.
Figure 4B:
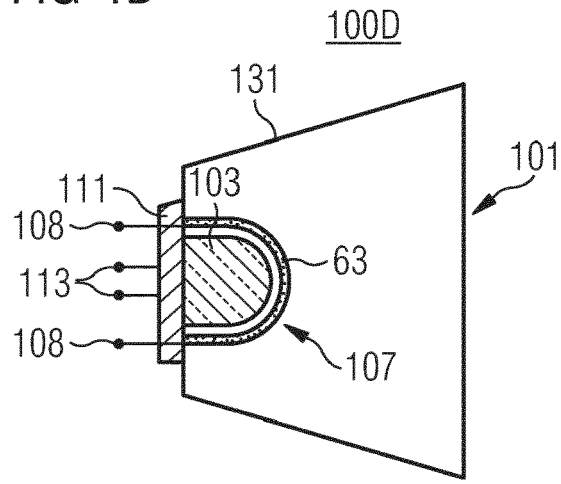

In the illumination devices 100C and 100D shown in FIGS. 4A and 4B, a modification of the position of the layer structure 107 is illustrated. Specifically, the layer structure 107 is positioned at the input side 131A of the TIR lens 131. In the embodiment shown in FIG. 4A, the layer structure 107 is positioned at a central portion of the interface, through which light from the light source 103 enters the TIR lens 131. Light entering through that central portion generally leaves the output face without internal reflection. Accordingly, by scattering a portion of that light, the spectral distribution of the output beam can be modified.

In the embodiment shown in FIG. 4B, the complete interface, through which light enters TIR lens 131, is laminated with the layer structure 107. In contrast to not scattered light, scattered light will be less collimated by the TIR lens 131 such that again the spectral distribution of the output beam can be modified.

In the embodiment shown in FIG. 5, a CPC-based illumination device 100E has the scattering layer 17 laminated on a reflective inner surface 142 of the CPC 141. In addition, a stopper element 143 is positioned to block any light emitted from light source 103 from directly exiting the CPC 141 through the output aperture 101. At an output side 141B of the CPC 141, the output aperture 101 may be formed by a transmitting exit window 145. Tuning electrodes 108 may be positioned at an input side 141A of the CPC 141 and can be connected with a (scattering control) power source to generate an electric field across the scattering layer 17.

FIG. 6 schematically illustrate the effect of the laminated scattering layer 17 on the appearance of the emitted light beam, specifically its perceived color. A first portion of the light emitted from the light source 103 is scattered before being reflected at the reflective inner surface 142 of the CPC 141, and a second portion of the light is scattered after being reflected at the inner surface 139 of the CPC 141. Accordingly, the inner surface 142 of the CPC 141 is the origin of diffusely scattered light 147. In addition, light is redirected to the output aperture without being scattered.

As in FIGS. 2A and 2B, two operation states are illustrated on the left part and on the right part of FIG. 6, respectively, each being again defined by respective voltage values V1, V2.

At the left part of FIG. 6, a 1st operation state is illustrated with no electric field applied as in FIG. 2A (V1=0). Then, the scattering condition is set such that a broad spectral range of the light emitted from the light source 103 is highly scattered. Accordingly, a collimated light beam 149A (exiting CPC 141 along a output direction 118) appears reddish, while the exit window 145 (due to broadband scattered light 147A) appears white, when looking at it from outside of the light beam 149A.

At the right part of FIG. 6, a 2nd operation state is illustrated with a preset electric field enforced across the scattering layer 17 as in FIG. 2B (V2>0). Then, the scattering condition is set to have low scattering, and the light beam 149B appears yellowish, while the exit window 145 (due to the mainly blue scattered light 147B) appears bluish, when looking at it from the side, i.e., from outside the light beam 149B.

By varying the electric field strength, the spectral appearance of the light beam can be set as a color point within the daylight locus in the CIE-xy-chromaticity diagram that is specific to the scattering properties of the scattering layer 17.

Figure 7:
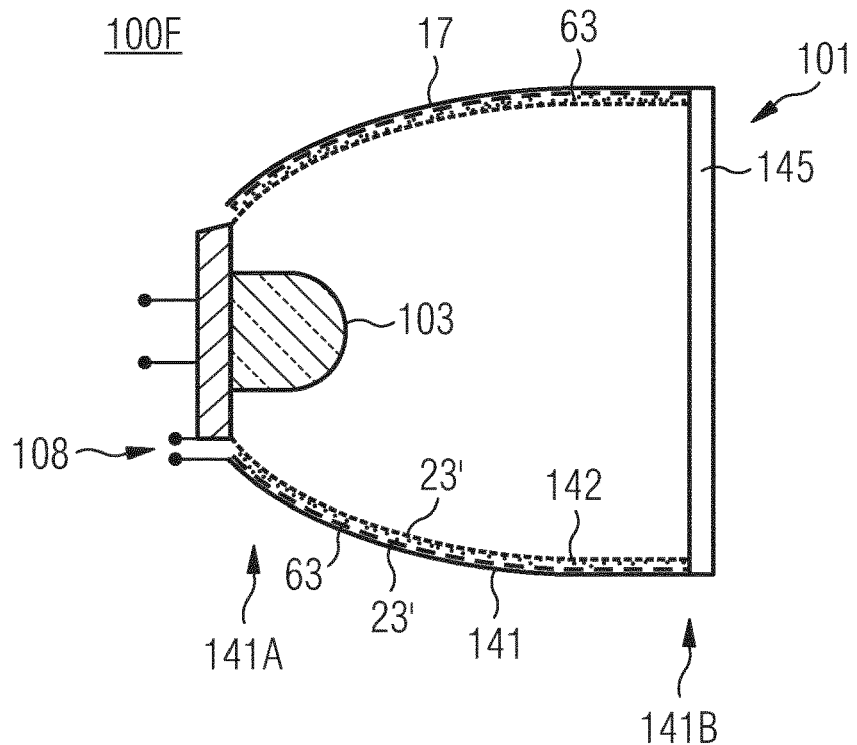
FIG. 7 is a schematic cross-section of a sixth embodiment of an illumination device.

In the embodiment shown in FIG. 7, a CPC-based illumination device 100F corresponds to the illumination device 100E, except that there is no beams stopper.

Figure 8:
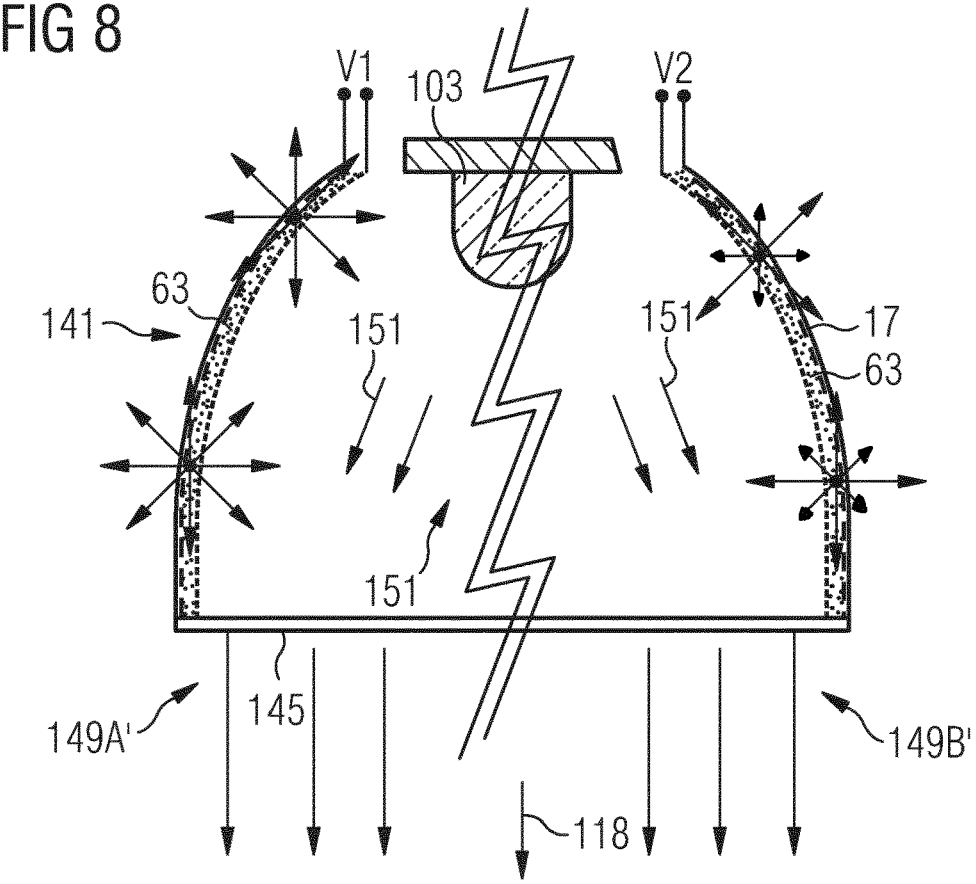
FIG. 8 is an illustration of the tunable scattering of the sixth embodiment.

Referring to FIG. 8, as a consequence, the light beams 149A' and 149B' comprise light 151 that directly was emitted from the light source 103 towards the output aperture 101. The light beams 149A' and 149B' comprises—as in FIG. 6—light that interacted with CPC 141 and, accordingly, was partially subject to being scattered at scattering layer 17 as for the illumination device 100E.

Accordingly, the original spectrum of light 151 from the light source 103 contributes to some extent to the appearance of the emitted light beam 149'. Thereby, the tunability range of the color spectrum of the direct light beams 149A' and 149B' may be modified, such as shifted and/or reduced in range.

While the illumination devices 100A to 100F relate to modules that are based on one light source associated with one respective collimation optics, scaling of the size of the total output aperture is possible by combining a plurality of respective illumination devices. In other words, an LED panel arrangement may be formed by a plurality of LED units (as light sources) each emitting light that is collimated with a plurality of collimation optical elements (e.g., a microlens array). Similar to illumination device 100A or 100B, a layer structure 107 can extends across the output apertures of one or more (even all) of the collimation optical elements. Alternatively, configurations as in FIG. 5 can be used to form an LED panel.

In some embodiments, a common layer structure may be used to control a plurality of illumination devices in the spectral appearance (e.g., when using a grid of TIR-based rectangular illumination devices as shown in FIG. 3A). Such a system is a kind of a back-lit LED panel. In general, known white light LED panels may be combined with a scattering layer, be it within the layered system of the LED panel or applied separately as an additional output window formed, e.g., by the layer structure 107.

Figure 9:
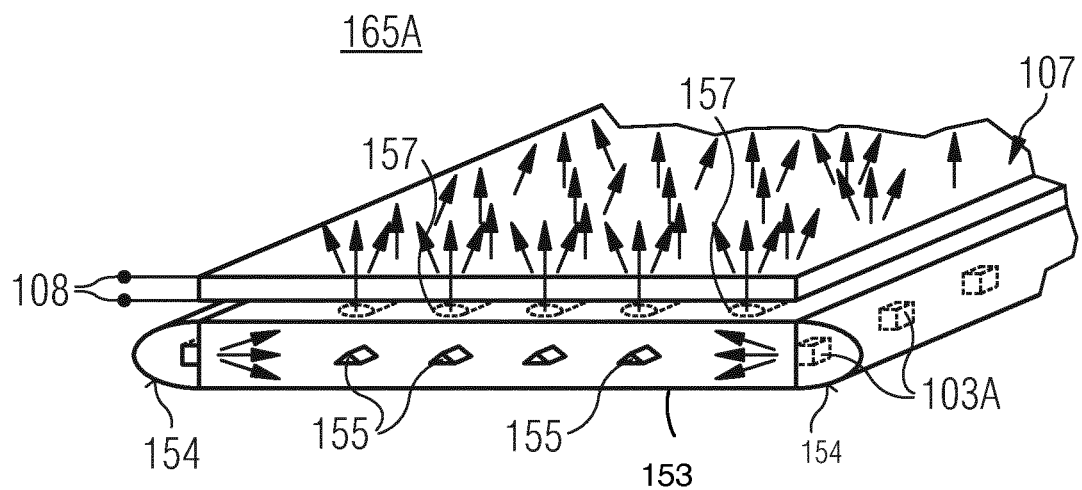
FIGS. 9 and 10 are illustrations of a back-lit LED panel embodiment and a side-lit LED panel embodiment, respectively.

FIG. 9 illustrates schematically a side-lit configuration of an LED panel 165A provided with a layer structure 107 as an output panel. As in common white light side-lit LED panels, LEDs 103A and its related collimating optics (common concentrators 154 are depicted schematically) couple white light into a light guide panel 153, from which light is extracted, e.g., by a prism structure 155. Moreover, FIG. 9 illustrates an additional (optional) refractive collimation optics that is configured as a lens array. Lenses 157 of lens array are matched in their position to the prism structure 155. Alternatively to a common concentrator 154 being coupled to all the LEDs 103A at one side, an array of concentrators (reflectors or TIR lenses) each coupled to an LED 103A or a transmission optics such as an array of collimating lenses (each coupled to an LED 103A) may be used (similar to FIGS. 1A and 3A, for example).

Figure 10:
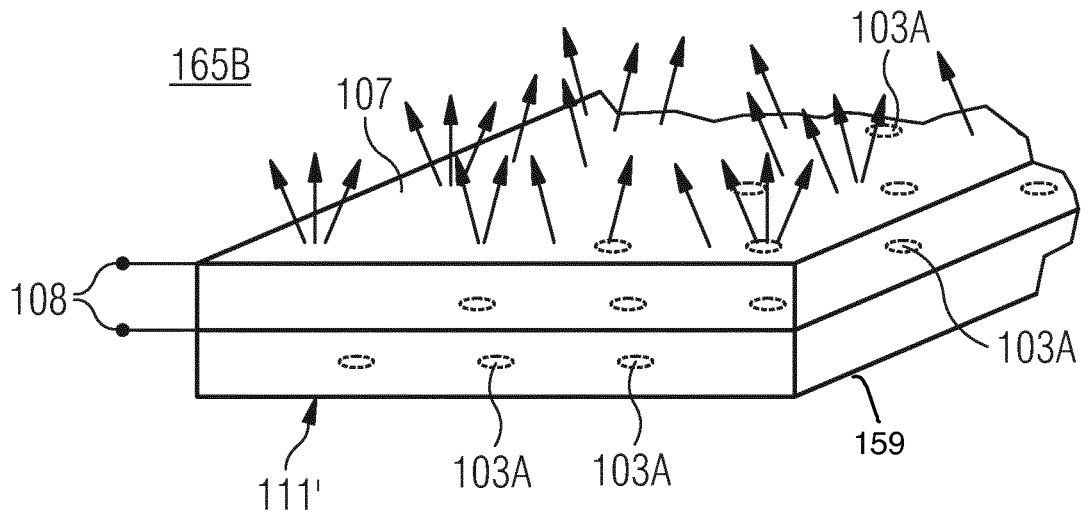

FIG. 10 relates to a further embodiment that is based on a diffused light emitting LED panel 159. In contrast to the previously described embodiments that make use of a collimation optics to form a light beam and to enable the scattering of color components out of the light beam, the LED panel arrangement 159 of FIG. 10 emits diffused light by means of a plurality of diffuse emitting LEDs 103A mounted on a common board 111'.

However, as the diffuse emitted light is partially back scattered, or back diffused onto the common board 111' by the layer structure 107 and at least some of the back scattered/back diffused light is absorbed from the board's structure, also in this case scattering induced by the layer structure 107 affects the spectral appearance of the LED panel 159.

While FIG. 10's LED panel 159 is exemplarily based on a back-lit configuration, similarly a side-lit configuration can be used. Then, the light is diffusely coupled out of the light guide panel, and the optical system is configured such that at least some back-reflected light from the scattering layer does not contribute to the spectral appearance of the diffused light emitting LED panel.

In the following, the optical considerations, and specifically features of the layer structure and in particular the scattering layer, are at first explained generally and then exemplarily in context with a liquid crystal nanodroplets implementation (FIGS. 11A to 17J). Finally, a microscopic parameter range associated with the tunable scattering is disclosed in connection with FIGS. 18 and 19.

Figure 11A:
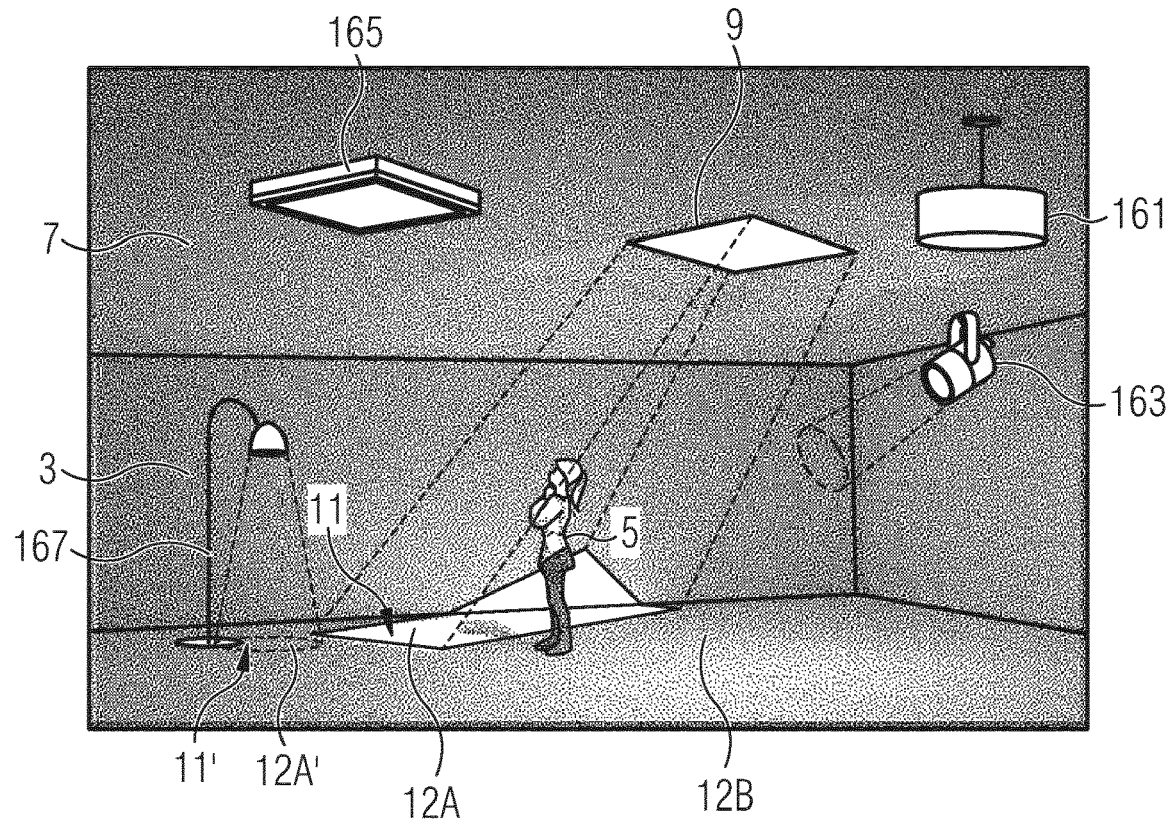
FIG. 11A is a schematic view of a room with illumination devices (as shown in FIGS. 1 to 10) and a sun-sky-imitating lighting system for chromatically adapted illumination.
Figure 11B:
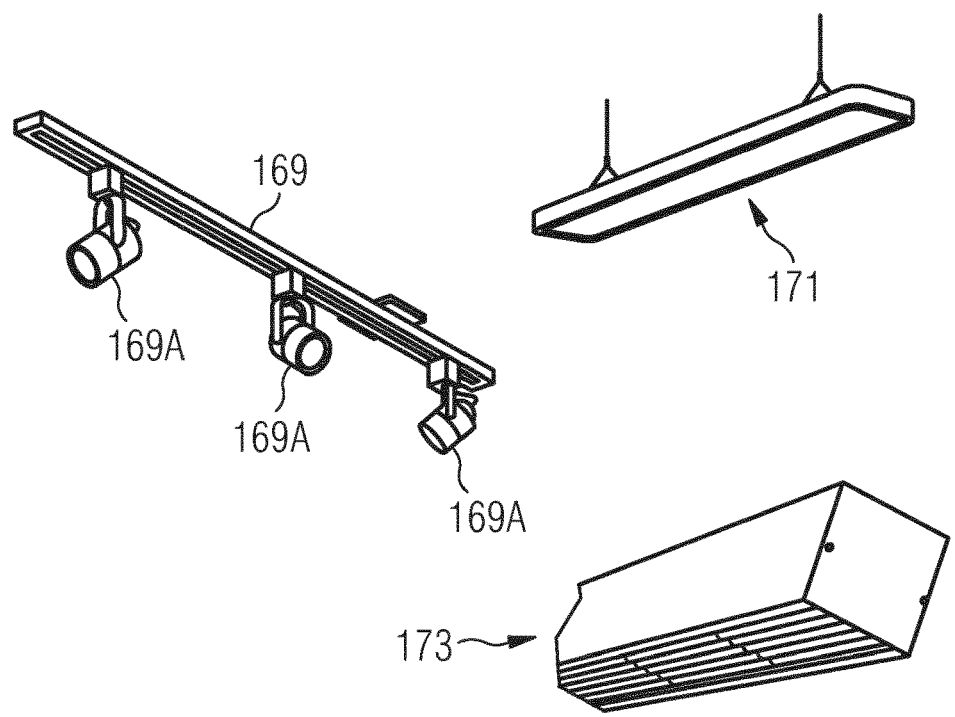
FIG. 11B shows additional exemplary embodiments of illumination devices.

FIGS. 11A and 11B illustrate that illumination devices can be implemented within a room 3, whereby the room 3 may already be illuminated with a sun-sky-imitating lighting system 9 as disclosed in the above mentioned applications. Specifically, FIG. 11A is a picture-like illustration of a model lighting configuration and FIG. 1B gives an overview of further lamps that can be based on the herein disclosed illumination devices.

During operation of the lighting system 9, a (Rayleigh-like) scattering layer is illuminated from above under an inclination angle by a white light source (not shown). Therefore, room 3 is illuminated by two types of light originating from the white light of the white light source. Specifically, by interaction with the Rayleigh-like scattering layer, the white light is separated into a transmitted warmer component (lower CCT) and a diffused colder component (higher CCT). As directed light, the warmer component simulates the sunlight and shines onto a limited area 11 within room 3 setting that area into a specific chromatic tone, e.g., its lower CCT is measured at an exemplary point 12A within limited area 11. As diffused light, the colder component is emitted and 11 simulates the sky. E.g., its higher CCT is measured at an exemplary point 12B outside limited area 11.

For the herein disclosed concepts, the appearance of the light source 9 itself, i.e. when looking at the light source, is of less relevance and it is referred to the above mentioned applications for further details.

However, a driving aspect of the present invention was inter alia that the directed light of light source 9 is emitted with a sunbeam like color that can even be tunable as disclosed in the above mentioned not yet published international patent application PCT/EP2017/057062. If additional white light illumination devices are installed in room 3, the compatibility of the emitted color spectra were identified as essential parameters for the acceptance of the illumination by an observer in the room 3.

FIG. 11A illustrate a plurality of potential embodiments of supplemental illumination devices with varying shapes, sizes, and functions. Those lamps can be provided e.g. in walls 3 and/or ceilings 7 such as a pendant lamp 161, a spot light 163, or an LED panel 165.

In addition, a stand-alone illumination device 167 is schematically illustrated in FIG. 11A, for which an area is schematically indicated that is illuminated by a direct light beam and that is characterized by the color spectrum at a further point 12A'.

As examples of further configurations, FIG. 11B shows a track light system 169 with three spot lights 169A, a suspended areal lamp 171 (in shape similar to a recessed or surface lamp), and a continuous row lamp system 173 of a plurality of single illumination devices lined up next to each other over a desired length.

The herein described embodiments of illumination devices allow varying the perceived color of the transmitted (and diffused) light by adapting the scattering cross-section via the refractive index mismatch and/or the effective size of scattering centers. Specifically, configurations become possible, in which the (spectral) transmittance of the scattering layer 17 is tuned, and thus the color of the transmitted light is tuned by scattering from being perceived with a white-yellow color (over orange) to being perceived with a reddish color. Tuning the transmittance, and thus the color of the transmitted light, opens the possibility to approach the sun's color variations during the day—be it in view of the real sun entering the room or sun imitating illumination system 9. Thereby, one can provide consistent color perception within a room.

Tuning the transmitted light by scattering allows an in principle loss free tuning—in contrast to absorption-based color tuning. The scattered light is (re-) used by illuminating the ambiance with a different diffuse emission characteristic than the remaining transmitted directed light. The perceived colors at points 12A, 12A', and 12B in FIG. 11A are created by wavelength dependent scattering processes.

Due to the tuning by scattering, the illumination within a room decreases in the limited area 11, 11' being directly illuminated with direct light beams (e.g. at point 12A, 12A').

In other words, the herein disclosed concepts allow matching color spectra of direct light beams by adapting operation states of the illumination devices, e.g. in agreement with the lighting system 9. Thereby, preferably a large chromatic range is covered from the sunny blue sky day at noon to the flat incident sun in the morning (or in the evening). As will be explained below, the herein described embodiments allow, for example, shifting the color of the direct light towards a sunset reddish color.

Referring to the CCTs provided by the lighting system, the CCT of the transmitted light is lower than the CCT of the diffused light. However, in different operation states, the CCT of the transmitted light and the CCT of the scattered light will both change in the same direction, i.e., both increase or both decrease, due to a decreasing or increasing scattering activity within the layer structure. It is noted that the skilled person will appreciate that a layer structure can be considered a diffuser unit as worded in the above mentioned not yet published international patent application PCT/EP2017/057062. For the person in the room 3, the color of the direct light will be primarily perceived, in particular if the exit windows of the illumination devices are small or hidden compared to the imitated "sky"-area of lighting system 9.

It is noted that the emitted color spectrum of the underlying light source does not need to be adapted to achieve the above tuning effects. Generally, the light source can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

For identifying the herein disclosed CCT values, u'v'-values, and the transmittance, the white light source is, for example, an E standard illuminant being an equal-energy radiator inside the visible spectrum. Although being a theoretical reference, the E standard illuminant gives equal weight to all wavelengths, and thus is suited in particular for wavelength depending scattering tuning Other standard illuminants (such as a D65 standard illuminant that provides uniform illuminance (lux/m) onto the sample over a large visible spectral range) can be used, for example, when comparing optical features with reference samples and transfer the measured results to the E standard illuminant, e.g. simply by normalizing the resulted spectrum by the spectrum of the illuminant.

Referring again to FIG. 11A, limited area 11, 11' can be illuminated with different color tones, which may dominate the perceived color of a room. At the same time, the color of the diffuse light may vary and thus influence the illumination of room 3 as well. Besides the perceived color tones, also the luminance within and outside of area 11, 11' is affected by the tuning.

In the following, aspects of the tunability of the refractive index of an ensemble of liquid crystal molecules are explained in connection with FIGS. 12A and 12B. Providing such ensembles in a nanostructure comprising nanodroplets in a liquid crystal (LC) based layer structure results in Rayleigh-like scattering that can be used for chromatically tuning the light interaction.

Figure 12A:
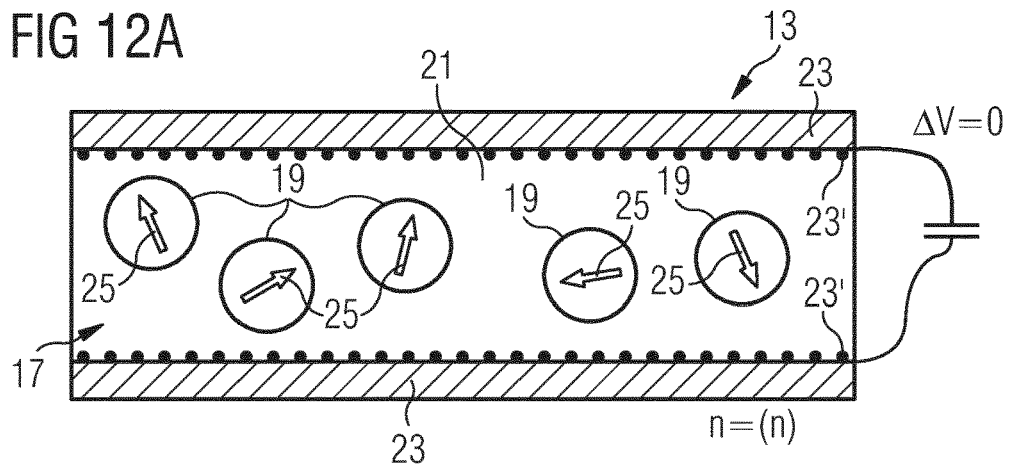
FIGS. 12A and 12B are schematic illustrations of operating states of a liquid crystal droplets based layer structure for chromatically tuning the transmittance.
Figure 12B:
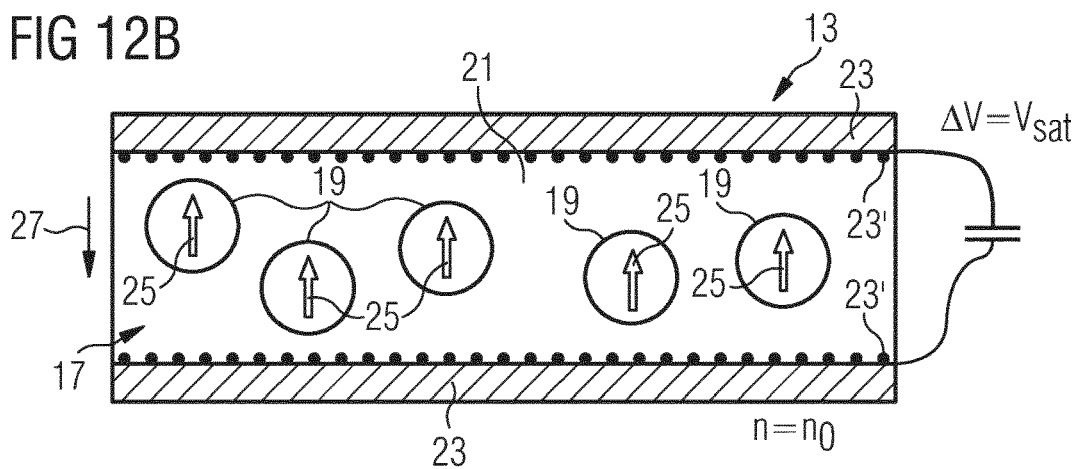

FIGS. 12A and 12B illustrate two different operating states of an LC based layer structure 13 as explained below. LC based layer structure 13 comprises the scattering layer 17 formed of LC nanodroplets 19 within a host material 21. For example, scattering layer 17 can be a polymer dispersed liquid crystal (PDLC) film. Each side of scattering layer 17 is in contact with a cover sheet, for example, the ITO glass sheets 23 that provides the areal electrical contacts 23'. Areal electrical contacts 23' extend in two-dimensions along the side faces of scattering layer 17. When a voltage (DC or AC) is applied to areal electrical contacts 23' (as schematically indicated in FIG. 12B by arrow 27), the pair of areal electrical contacts 23' enables creating a (large-area) electric field for interacting with LC nanodroplets 19 distributed in the two-dimensional film/layer. At least one of the pair of areal electrical contacts 23' is configured to transmit visible light. Accordingly, light—e.g. from a white light source—can enter scattering layer 17 and scatter at nanodroplets 19 that represent accordingly nanoscale scattering elements.

Assuming the liquid crystals have (at least) an optical uniaxial anisotropy, its index of refraction can be approximated by two principal refractive indices, an ordinary refractive index $n_o$ associated with linear polarization states orthogonal to the optical axis, and an extraordinary refractive index $n_e$ with linear polarization states parallel to the optical axis. Thus, light propagation in liquid crystals along or normal to the optical axis will be subject to different refractive indices. Their difference results in a birefringence $\Delta n = n_e - n_o$. The birefringence $\Delta n$ is usually positive for LCs and may vary in a range from 0 to about 0.5, e.g. be about 0.1 or 0.3. Various types of liquid crystals are mentioned below indicating potential ranges of $n_e$ and $n_o$.

In FIG. 12A, the direction of a resulting optical axis for each of the plurality of nanodroplets 19 is indicated by arrows 25. Without any external influence (e.g. there is no electric field applied), the orientation of arrows 25 for the plurality of nanodroplets 19 can be assumed to be arbitrarily distributed in all directions. In other words, in an ensemble of liquid crystal droplets within such a polymer film and without an applied electric field, inside each single nanodroplet, the liquid crystal molecules may have a certain order due to the organization properties of the LCs resulting in the optical axis indicated by the arrows 25, but that order within each nanodroplet will essentially randomly vary from nanodroplet to nanodroplet. As a consequence, an average refractive index ⟨n⟩ can be associated with the ensemble of liquid crystal droplets $$\langle n \rangle = \frac{(n_e + 2n_o)}{3}.$$

The average refractive index ⟨n⟩ is independent of the angle of incidence and can be associated with an OFF operation state of LC based layer structure 13, i.e. no voltage is applied between areal electrical contacts 23' (ΔV=0). The average refractive index ⟨n⟩ is herein also referred to as n_OFF.

Referring to FIG. 12B, applying an electric field between areal electrical contacts 23' introduces a—gradually with the voltage/electric field increasing—alignment of the LC molecules within each nanodroplet, as will be further explained below. For example, electric field values of about e.g. 1-20 V/μm or 10-30 V/μm may be needed to enforce maximum alignment of the LCs within a nanodroplet together with a maximal alignment of all orientations, as illustrated in FIG. 12B.

The alignment changes the refractive index that is experienced by light propagating in a specific direction. Specifically, the alignment removes the random orientation of the nanodroplets resulting optical axes such that the anisotropy of the LC starts to influence the optical features of scattering layer 17. Applying a voltage between areal electrical contacts 23' (ΔV≠0) at least to some extent forces an alignment of arrows 25 with the electric field in line with any associated electric (permanent or induced) dipole moment of the LCs/the LC nanodroplets.

The alignment increases with increasing electric field. At the interface between the liquid crystal phase within a nanodroplet and the surrounding host material, there may be an interaction between the host material and a LC such that not all LCs within a nanodroplet may align with the electric field. For a given configuration of scattering layer 17, generally, a saturation voltage Vsat is associated with the electric field that achieves the maximal (or essentially maximal) alignment. FIG. 12B illustrates schematically the maximal (or essentially maximal) alignment of the LCs at Vsat by showing all arrows 25 to be parallel to the indicated electric field direction of arrow 27.

For example, assuming that the optical axes of all molecules align along the electric field (i.e. a saturation voltage is applied across the PDLC film), light propagating along the electric field/the optical axes experiences essentially the refractive index $n_o$. Thus for that specific propagation direction, a tunability range of the index of refraction experienced within nanodroplets extends from ⟨n⟩ to $n_o$, herein referred to as the tuning range δn=|⟨n⟩−$n_o$|.

Due to the above mentioned influence of the interface between nanodroplets and host material, for small nanodroplets having a relatively large volume portion being subject to the influence and a small central inner portion being less influenced, a larger electric field will be needed to reorient also those liquid crystal molecules being influenced by the interaction with the host material. Scattering layer 17 may be reduced in thickness to enable a larger electric field strength for nanodroplets for lower voltages such that Vsat can be reached even at acceptable low voltages for e.g. nanodroplets based PDLC films.

Figure 13:
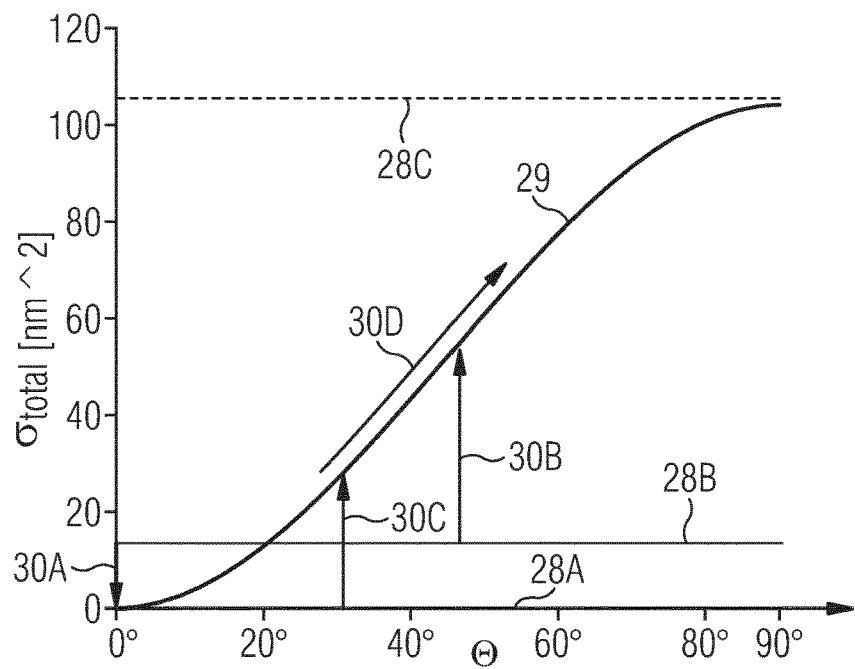
FIG. 13 is a schematic illustration of the total cross-section in dependence of the incidence angle for an exemplary PDLC-based layer structure.

Light propagating under an angle with respect to the direction of the optical axis will experience at least partly the extraordinary refractive index $n_e$ for a linear polarization direction in the direction of the optic axis becoming apparent from FIG. 13.

In FIG. 13, the total ensemble scattering cross-section amounts a $\sigma_{total}$ (herein also referred to as total scattering-cross section) are simulated for the below in more detail explained PDLC film configuration of NOA65 and E7 for a wavelength of about 550 nm and maximum alignment at Vsat. Specifically, there is an independence from the incident angle θ of the total scattering-cross section for isotropic nanodroplets being associated with refractive indices of no, ⟨n⟩, and ne (illustrated as lines 28A, 28B and 28C, respectively), with constant values derived from a Rayleigh-like/Mie scattering model.

For anisotropic LC nanodroplets and for incident light in a p-polarization state, the dependence from the incident angle θ of the total scattering-cross section is illustrated as a schematic curve 29. For anisotropic LC nanodroplets and incident light in the s-polarization state, there is again an independence from the incident angle θ of the total scattering-cross section, which is at a value corresponding to line 28A (cross-section associated with no) for isotropic LC based nanodroplets because the anisotropy does not affect s-polarized light. One acknowledges that for orthogonal incidence, only the total scattering cross-section associated with no applies, while for tilted incidence the anisotropy contributes to the scattering. The dependence is related to the single particle scattering cross-section.

It is noted that, for the PDLC film configuration of NOA65 and E7 (see e.g. also FIG. 14A), for $n_o$ there is essentially no index mismatch present so that the total scattering-cross section is close to zero. The largest index mismatch is given for $n_e$, resulting in the largest total scattering-cross section in the p-polarization state for "parallel" incidence.

Figure 14A:
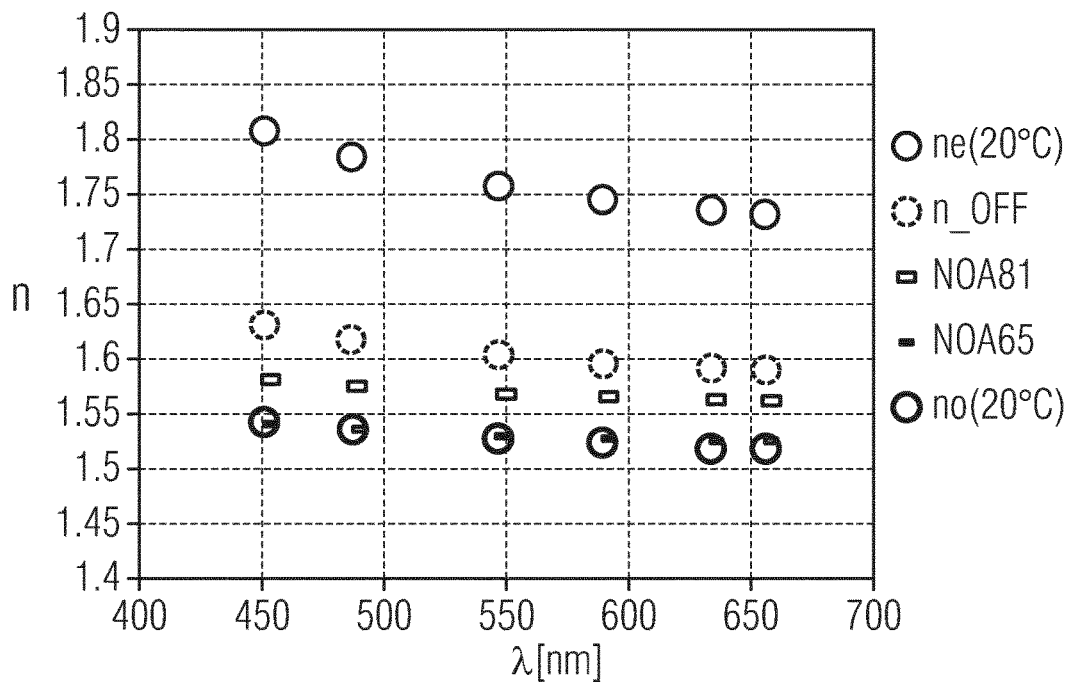
FIGS. 14A and 14B illustrate an exemplary refractive index wavelength dependence and exemplary combinations of substances used in PDLC-based layer structures.
Figure 14B:
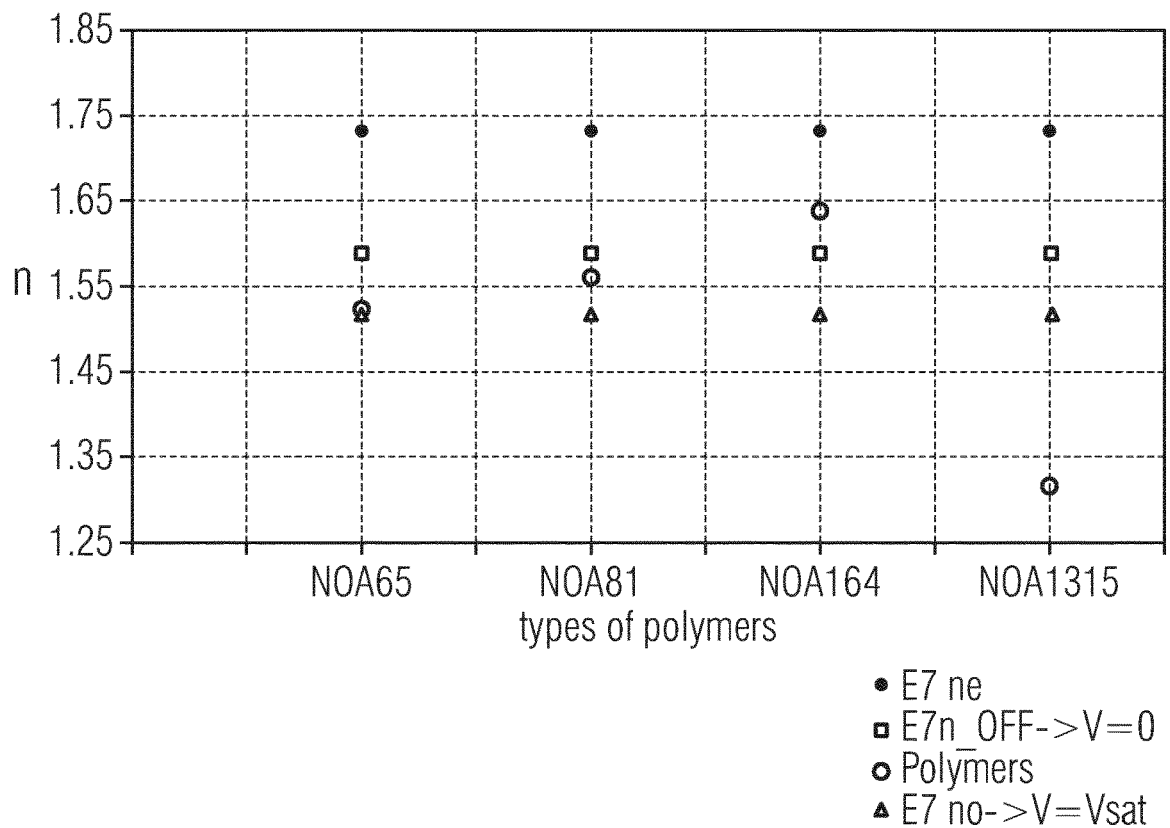

With reference to FIG. 14B, it is noted that for other PDLC film configurations, $n_o$ may differ from $n_h$ such that there is always an index mismatch present for s-polarization. However, depending on the relative position of $n_h$ being either in-between or outside the range defined by $n_o$ and $n_e$, there may be a "zero" crossing of the total cross section or not for a single polarization as will be understood by the skilled person.

Further, for a not-polarized light beam, a superposition of the total scattering-cross sections for p-polarization and s-polarization applies. In the example illustrated in FIG. 13, this means that 50% of the light is not scattered at any angle and that the remaining 50% of light are scattered in accordance with curve 29. In other words, the total scattering cross-section of curve 29 would be halved but maintain its general shape. Similar considerations apply to other PDLC film configurations.

For the PDLC film configuration of NOA65 and E7, FIG. 13 also illustrates the tuning possibilities of the various LC based tuning configurations discussed herein such as the electric field based tuning, the incident angle based tuning, and the polarization based tuning Specifically, in that configuration, the PDLC film comprises a nematic liquid crystals mixture "E7" produced by Merck KGaA embedded in the Norland Optical Adhesive 65 (known as "NOA65") produced by Norland optics Inc.

With respect to tuning the mismatch of refractive indices (and thus the Rayleigh-like scattering cross-section due to tuning the relative refractive index m), the embodiment of LC based layer structure 13 provides for an OFF operation state with the average refractive index n_OFF (i.e. ⟨n⟩) applicable to all incidence directions. In addition, in dependence of the applied voltage, for each incidence direction, the refractive index will change until Vsat is reached and the associated refractive index (based on essentially all LCs being aligned) has been established. This corresponds to a range of V-operation states, beginning at the OFF operation state and continuing up to a Vsat-operation state.

For example, arrows 30A and 30B indicate tuning ranges for electric field based tuning for orthogonal incidence (0°) and inclined incidence (45°). The total scattering cross-section starts for each incidence angle at a value unequal zero corresponding to ⟨n⟩ for V=0 and decreases to (almost) zero for orthogonal incidence while increasing for 45° incidence until the for not-polarized light adapted value of curve 29 is reached.

Moreover, for any applied electric field that results in at least some degree of alignment (i.e. no random distribution), the refractive index will change when the incident angle θ is unequal zero and the polarization of the "to be scattered" light is changed.

For an incidence angle of 30°, arrow 30C illustrates the tuning for a polarization change from s-polarization to p-polarization, assuming a static electric field being applied by, e.g. Vsat. For s-polarization, the total scattering cross section starts for each incidence angle at almost zero and increases (assuming at least some incidence angle larger 0°) to the total scattering cross section for p-polarization as schematically indicated by arrow 30C for the incidence angle of 30°.

Moreover, for any applied electric field that results in at least some degree of alignment (i.e. no random distribution), the refractive index will change when the incident angle θ of the "to be scattered" light is changed. Herein a changing incident angle is associated with, for example, different regions on the inner surface of a CPC. This aspect corresponds to (V-dependent) θ-operation states. θ-operation states are in principle applicable to any V≠0, the largest effect is given for Vsat. Moreover, the direction of the chromatic tuning depends on the relative size between ⟨n⟩ and $n_o$, i.e. whether more scattering occurs close to e.g. normal incidence or "parallel" incidence of white light onto a layer structure.

Arrow 30D illustrates the tuning for a change in incidence angle, assuming a static electric field being applied by, e.g., Vsat as it can be used for specific exemplary sun-sky-imitating lighting systems described in the mentioned not yet published international patent application PCT/EP2017/057062. Again starting at orthogonal incidence with a total scattering cross section of almost zero, the scattering activity increases along the for not-polarized light adapted curve 29 with increasing incidence angle.

Furthermore, it will be clear that the same tuning of the mismatch in refractive index can be realized in configurations, in which the host material is composed of LCs and the nanodroplets are replaced by e.g. a static nanostructure such as by solid nanoparticles.

As mentioned above, the tuning behavior (increase/decrease/change between increase and decrease in scattering activity) may differ for other PDLC film configurations when using the various tuning approaches disclosed herein, depending on the relative refractive indices (see FIG. 14B described below).

In summary, depending on a pre-selected or changing propagation direction, a preselected or changing electric field, and/or a pre-selected or changing polarization, operation states of the layer structure 13 with different optical scattering parameters can occur.

In view of the above, there are specific refractive index parameters that characterize the mismatch of a specific layer configuration: the index of refraction of the host material $n_h$ (in a PDLC film a non-tunable material), the averaged refractive index ⟨n⟩ (n_OFF, associated with the random average orientation of LC within the nanodroplets), and the index of refraction at saturation $n_o$. For orthogonal incidence on a LC droplet based scattering unit, those parameters define the chromatic tunabilty of the LC based scattering unit. As pointed out above, the chromatic tunabilty varies further with the incident angle.

FIG. 14A illustrates the above parameters, and thus the range of tunability of the above mentioned exemplary PDLC film of NOE65 and E7 for the visible wavelength range. E7 has a relatively high birefringence and a positive dielectric anisotropy. E7 contains several cyanobiphenyl and cyanoterphenol components at a specific composition. The optical properties allow a large tunable range of the refractive index for nanodroplets that can then be used for Rayleigh-like scattering in a PDLC scattering unit. NOA65 is a clear, colorless, liquid photopolymer that forms the transparent structural basis of the scattering unit. Curing of NOA65 can be performed with ultraviolet light exposure, where the curing process depends mainly on the intensity of the UV light used for polymerization.

Specifically, FIG. 14A shows the refractive index $n_h$ of NOA65 which decreases from about 1.540 at 450 nm (at 20° C.) to 1.524 at 650 nm (data points "NOA65"). Furthermore, FIG. 14A shows the average refractive index n_OFF of E7 for randomly oriented liquid crystal molecules (no voltage applied; data points "n_OFF"). The average refractive index n_OFF decreases, however, generally at larger refractive indices as NOA65 from about 1.632 at 450 nm (at 20° C.) to 1.590 at 650 nm. Similarly, the ordinary refractive index of aligned liquid crystal molecules (i.e. the ordinary index of refraction at saturation no, i.e. saturation voltage applied; V=Vsat, data points) "no(20°)") decreases, however, at values comparable to the ones of NOA65. For example, the ordinary refractive index no of E7 decreases from about 1.543 at 450 nm (at 20° C.) to 1.518 at 650 nm. The range of tunability δn is accordingly 0.09 at 450 nm and 0.07 at 650 nm and accordingly comparable across the visible wavelength range. In FIG. 14A in addition, the extraordinary refractive index $n_e$ of the respective liquid crystal molecules (data points) "ne(20°)") and the refractive index of NOA81 (data points "NOA81") as an alternative host material are indicated for completeness. The refractive index $n_h$ of the alternative polymer NOA81, which decreases from about 1.58 at 450 nm (at 20° C.) to 1.56 at 650 nm (data points "NOA81"), i.e. larger than for NOA65.

In view of the comparable refractive indices of the matrix $n_h$ for NOA65 and the liquid crystal under saturation $n_o$, it becomes clear that the range of tunability may also cover the situation of an essentially non-scattering condition, i.e. unaffected transmission of the light with the respective incident angle (transmission mode of the scattering unit). Moreover, for the above situation, the index mismatch between the host material and the scattering nanodroplets is given by the range of tunability δn, ending essentially at no index mismatch for Vsat for orthogonal incidence.

FIG. 14B illustrates an overview of refractive index parameters at 650 nm for four host polymers, including NOA65 and NOA81 of FIG. 4A as well as two further alternative host materials, for which there are—like for NOA81—no transmission modes of the scattering unit at the end of the tunability range of E7 (for orthogonal incidence). For E7, the ordinary, extraordinary and the average index of refraction are indicated for comparison.

For the host material NOA81, the refractive index $n_h$ is in-between n_OFF and $n_o$ of E7. For the host material NOA164, the refractive index $n_h$ is about 1.64, i.e. even larger than n_OFF of E7. For the host material NOA1315, the refractive index $n_h$ is about 1.32, i.e. significantly lower than $n_o$ of E7. Similarly, there is also a large variety of liquid crystals and respective values for n_OFF, $n_o$, and $n_e$ so that in principle there is a wide range for selecting optical parameters defining the operation states of a layer structure based on the range of tunability δn and the refractive index $n_h$.

Further exemplary materials for liquid crystal are disclosed in the mentioned not yet published international patent application PCT/EP2017/057062 in connection with a manufacturing process.

FIGS. 15A to 15D show schematic uniform chromaticity diagrams (also referred to as CIE 1976 u'-v'-chromaticity diagram) to illustrate the change in the color of the transmitted direct light (herein considered as the light within the full width at half maximum of the luminous intensity distribution) as well as the diffused light (being outside that full width at half maximum of the luminous intensity distribution). Therein, points on a border line 32 (the two sides of the triangular-like shape) correspond to monochromatic spectra (delta-like); in other words, the wavelengths increase at the curved surface border on the left and top side from, for example, 420 nm at the bottom point to about 510 nm at the top left corner to about 680 nm at the right corner. The coordinates are referred to as u'-chromaticity coordinate and v'-chromaticity coordinate. In addition, a Planckian locus 31 is indicated in the figures representing the spectrum of a Planck radiator at respective temperatures, for example, in the range from below 1000 K to about 100 000 K. Planckian locus 31 further defines the CCT for the various temperatures.

Figure 15A:
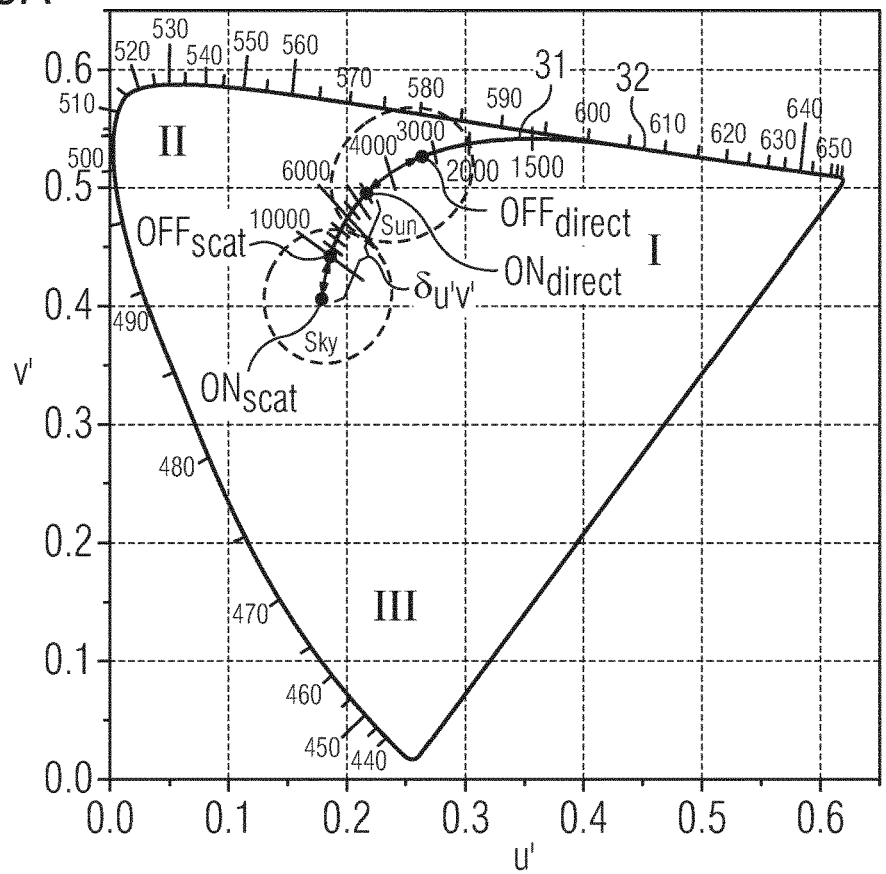
FIGS. 15A to 15D show schematic uniform chromaticity diagrams for illustration of the chromatic perception of tuned transmittances of a layer structure for a white light source illumination and an exemplary change in the respective chromatic perception of the diffused light.

In FIG. 15A, color areas are schematically indicated. Specifically, the reddish area is referenced as I, the greenish area as II, and the bluish area as III. The reddish area I and the greenish area II are essentially separated by Planckian locus 31 in the range from 2000 K to 10000 K, and Planckian locus 31 points to the bluish area III. In the region of the ending of the Planckian locus 31, a mix of colors results in a whitish appearance of the colors.

For a sun-like color spectrum, the color of the direct light is close to Planckian locus 31—first CCT, while the color of the scattered light is in the bluish area III—second CCT. To provide for a difference between the first CCT and the second CCT resulting in the unique perception associated with the sun and sky at noon, the coordinates of the respective colors within the uniform chromaticity diagram may differ at least in the range from a Δu'v' of at least 0.008 such as at least 0.01, 0.02, 0.025, 0.03 or 0.04 such as 0.5 or more. For example, providing the second CCT in the range of or at least close to the Planckian locus 31 at about 10 000 K will result in the sun appearing at the first CCT in the range from 800 K to 6500 K.

In FIG. 15A, exemplary regions "Sun"/"Sky" are schematically indicated within the uniform chromaticity diagram. As will be explained below, associated points within the regions "Sun"/"Sky" represent an operation state associated with specific parameter settings of the layer structure. FIG. 15A illustrates the tunability of the first and second CCTs for a refractive index configuration similar to the E7/NOA65 scattering unit of FIG. 14B. Exemplarily, an OFF-state (OFF) and an ON-state (ON) are illustrated for the above discussed NOA65/E7 configuration at orthogonal incidence for the first CCT and the second CCT, wherein increasing the electric field decreases the total scattering cross section. It will be appreciated that different tuning directions may be set.

It is noted that artificial (unnatural) effects may be achieved by tuning the spectrum of the "to be scattered" light by moving it away from Planckian locus 31, thereby, for example providing a greenish background.

Figure 15B:
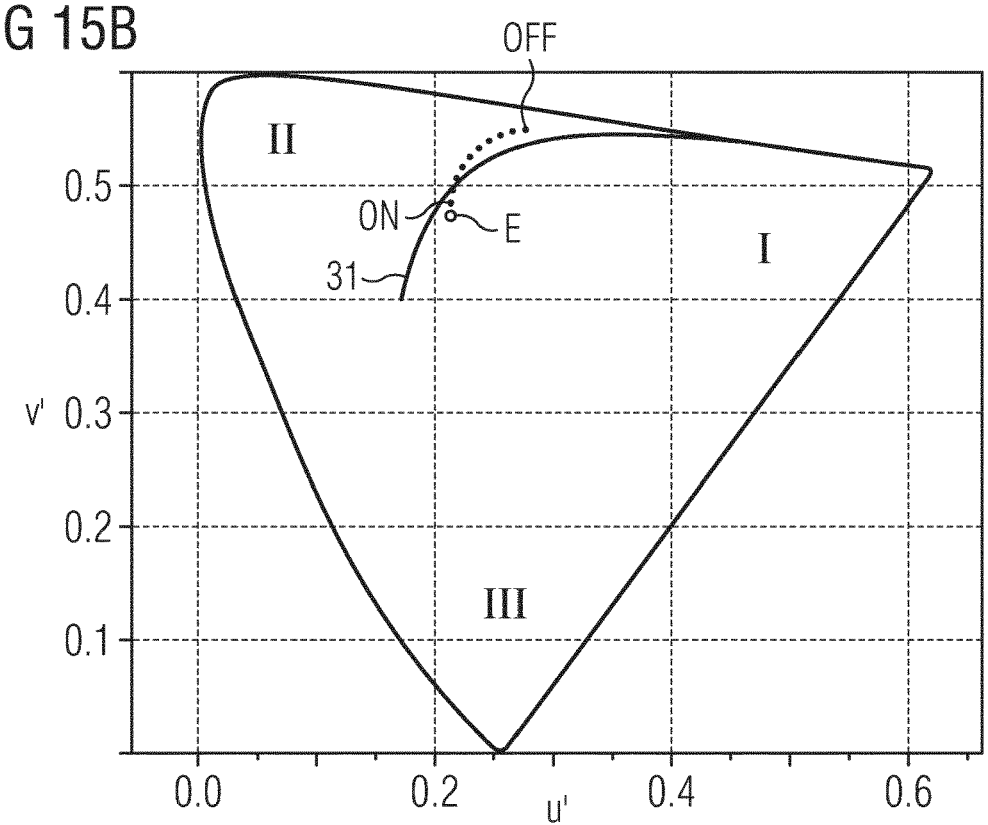
Figure 15C:
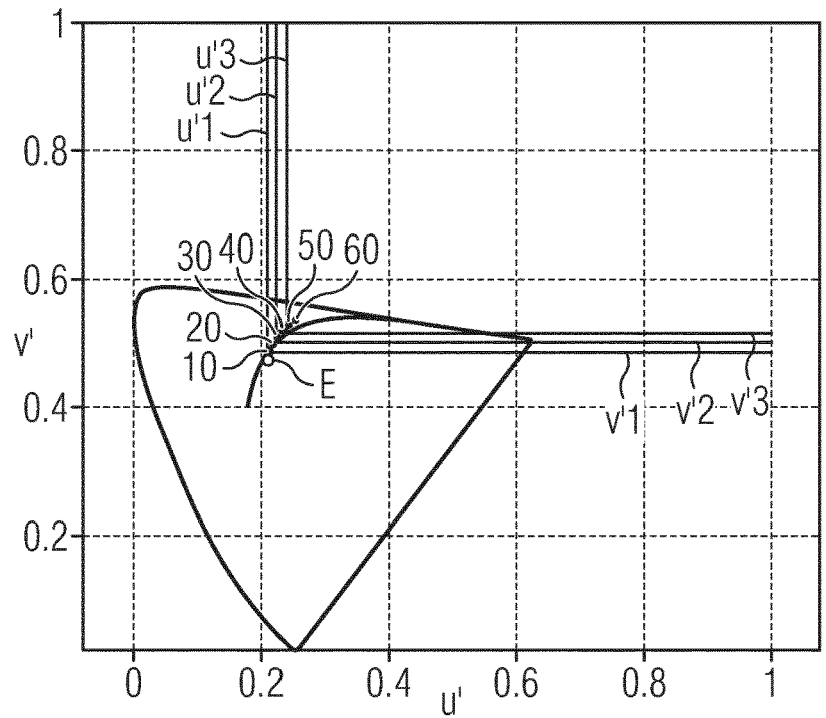
Figure 15D:
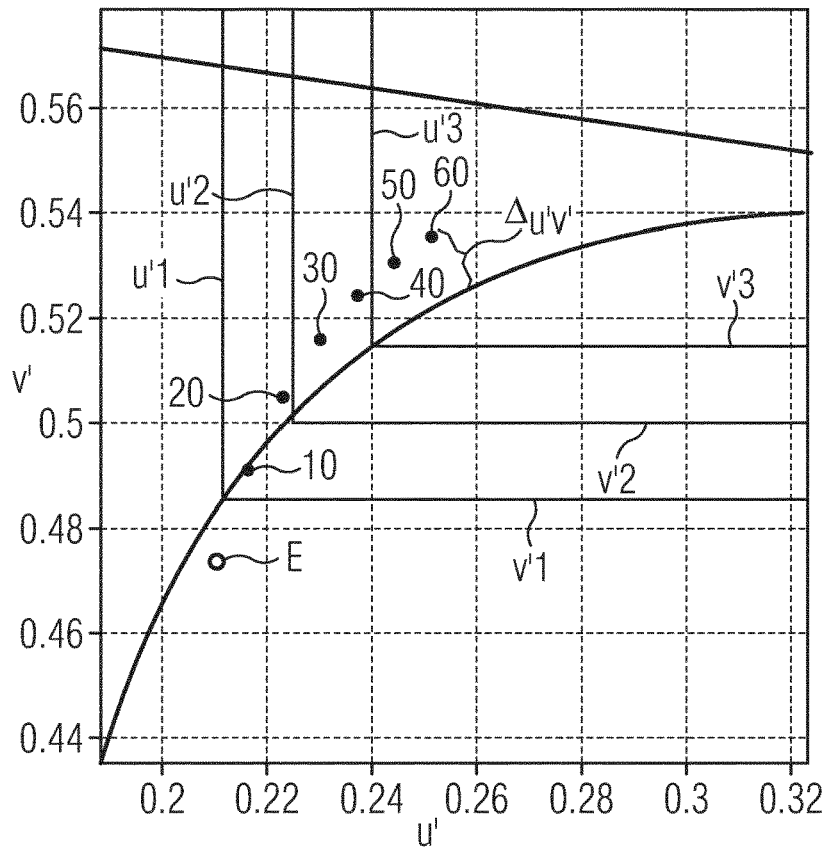

For a well-defined input light source such as the E standard illuminator (equal-energy radiator with a spectral power distribution (SPD) constant inside the visible spectrum), the uniform chromaticity diagrams of FIGS. 15B to 15D illustrate the chromatic changes in the perceived color of the transmitted direct light, each color perception being associated with a respective set transmittance of the layer structure, i.e. operation state. Thus, FIGS. 15B to 15D illustrate schematically the tunability of the first CCT for the transmitted directed light in more detail for an increasing electric field. Tuning the first CCT by scattering will affect also the second CCT.

As will be acknowledged in view of FIG. 15A, increasing the scattering activity moves the color of the direct light towards red and the blue of the diffused light towards white, while reducing the scattering activity whitens the transmitted light and intensifies the blue of the diffuse light. This is similar to the case for increasing/reducing the number of Rayleigh scatterers in nature. For example, increasing the index mismatch shifts the transmitted light to white-yellow (around a Planckian locus value of 6000K/5500K/5000K), to orange (around a Planckian locus value of 4000K/3000K), and to red (around a Planckian locus value of 2000K) and may at least for large scattering activity whiten the blue of the diffused light.

In the uniform chromaticity diagram of FIG. 15B, ten operating states with increasing electric field are illustrated based on respective u'v'-data points for the previously discussed PDLC film NOA65/E7, a LC droplets size of about 100 nm, a sample thickness 100 μm, and a filling ratio of about 50%.

It is assumed that the PDLC film is illuminated with an E standard illuminant under normal incidence (orthogonal incidence at 0°). The color point E illustrates the color associated to the E standard illuminant.

In the OFF state (color point OFF), maximum scattering is present (largest cross-section in FIG. 3, <n>). In the ON state (color point ON), minimum scattering is present (smallest cross-section in FIG. 13, no) is present. Accordingly, when increasing the electric field, the color points move (essentially) along the Planckian locus 31 towards the color point E. Accordingly, the color will change from an orange/yellow to the color associated to the color point E (which is similar to the D series illuminant with a CCT of 5455 K).

In the uniform chromaticity diagrams FIG. 15C and FIG. 15D (magnification of respective area of FIG. 15C), three reference color points are defined by lines u'1/v'1, u'2/v'2, u'3/v'3 given by the u'- and v'-values 0.212/0.485, 0.225/0.5, and 0.24/0.514, respectively. The reference color point are increasingly larger in their u'- and v'-values than the color point E (i.e. increase in their Euclidean distance to the color point E).

In addition, for the above PDLC film NOA65/E7 (LC droplets size of about 100 nm, in the OFF state), sample thicknesses of 10 μm, 20 μm, 30 μm, 40 μm, 50 μm, and 60 μm are illustrated by color points 10, 20, 30, 40, 50, and 60, respectively, again for assumed illumination with the E standard illuminant. Increasing the thickness changes the number N of nanoscale scattering elements per unit area assuming that the remaining parameters remained the same. One recognizes that the number N of nanoscale scattering elements per unit area associated to the above thicknesses are beyond (at larger values than) the respective lines u'1/v'1, u'2/v'2, u'3/v'3. Thus, for a scattering layer, the herein discussed parameters (maximum) relative refractive index, refractive index of the host material/the scattering elements, and effective size relates to a minimum number N of nanoscale scattering elements per unit area that is needed to create a color point beyond the above values. On the other side, the requirement that a dichroic illumination should be given, at least some regular transmitted light should maintain, which results in a maximum number N of nanoscale scattering elements per unit area and a respective u'-limit associated with a specific required minimum transmittance.

As further will be appreciated the number N of nanoscale scattering elements per unit area depends on the incidence direction associated with the impinging light resulting in the regularly transmitted light because in general, the scattering layer has a layer-like two-dimensional shape associated with a layer thickness. This applies also for curved layers in general. Thus, while for normal incidence, the desired number N of nanoscale scattering elements per unit area may not be reached, for some incident angle the desired number N of nanoscale scattering elements per unit area may apply and generate regularly transmitted light at a desired color point.

Figure 16A:
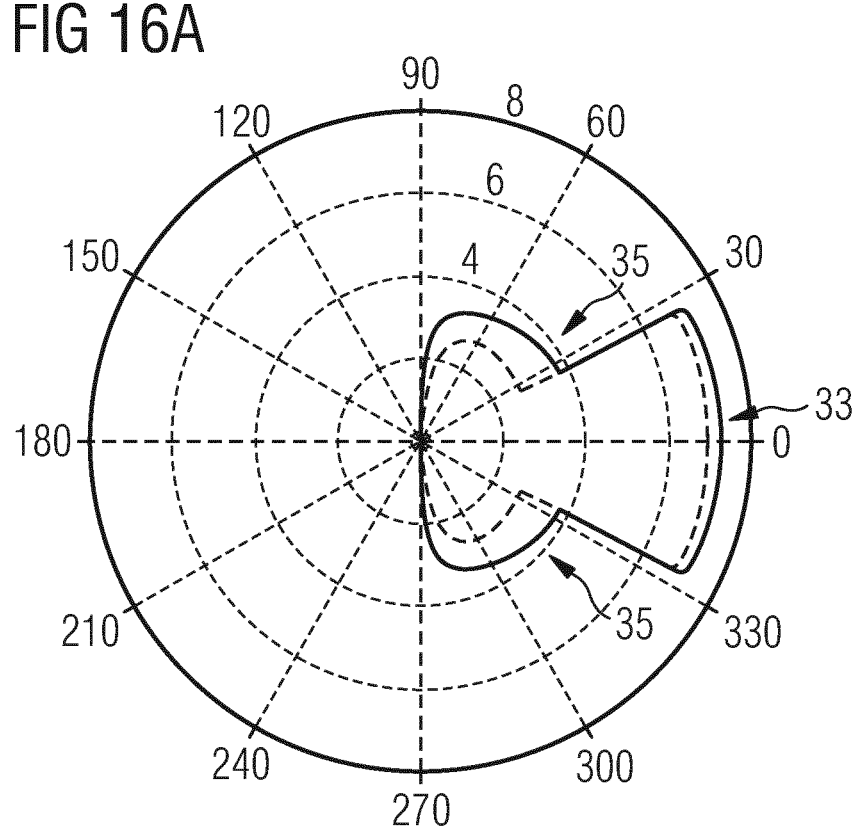
FIGS. 16A and 16B show two schematic polar plots illustrating the differences in light interaction for two exemplary visible wavelengths.

In FIGS. 16A (ON-state) and 16B (OFF-state), those chromatic effects are further illustrated using polar plots of the luminous intensity, i.e. the light power emitted from the layer structure in a particular direction per unit solid angle (weighted by the luminous efficiency functions and assuming normal incidence of the impinging white light onto an NOA65/E7-based layer structure). The behavior is representative for any type of white light illumination but is schematically indicated for an assumed illumination with a blackbody illuminator at a CCT of 6500K. The luminous intensity distribution depends on two angular coordinates $\vartheta$, $\varphi$, wherein in the illustrated plots, the angular coordinate $\varphi$ is directed in an arbitrary selectable plane of incidence due to the assumption of an orthogonal incidence of a rotational symmetric white light beam onto a planar layer structure (e.g., the situation given in FIGS. 1A and 1B). In the polar plots, the luminous intensity is illustrated in a logarithmic arbitrary scale for two wavelengths corresponding to a blue component (450 nm: through line) and a red component (600 nm: dashed line).

Specifically, one recognizes a directional light portion 33 and a diffused light portion 35. Directional light portion 33 still propagates in a direction of 0°, however, with an angular width of e.g. about 40° FWHM corresponding to a large divergence of divergent illumination.

In addition, the Rayleigh-like scattering resulted in the generation of diffused light portion 35 having a luminous intensity distribution that is indicated by a small half-circular-looking curve section at a reduced intensity.

Enhanced blue scattering conditions are illustrated in FIG. 16A showing primarily the blue component contributing to diffused light portion 35, while the directional light portion 33 (assuming a blackbody-like wavelength dependent intensity distribution) illustrates comparable contributions of the blue and red components.

Figure 16B:
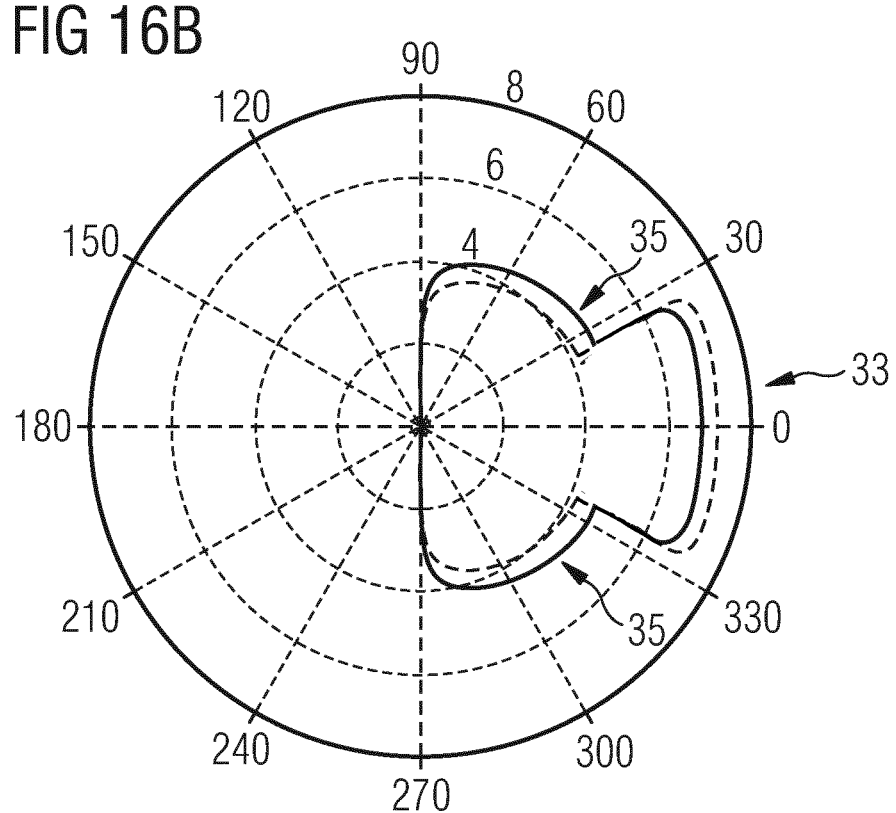

Referring to FIG. 16B, for increased scattering of the red component (similar to the low sun scattering condition), the red contribution is significantly increased for diffused light portion 35. At the same time, the red component is relatively increased in directional light portion 33 because more blue light is scattered out. Accordingly, the direct light beam appears more orange/red, while the diffuse blue appears more whitish.

It can be noted that the uniformity is increased in FIG. 16B with respect to FIG. 16A as the relative intensity differences between directed light and diffused light become smaller for increased scattering activity.

It is again noted that—assuming an anisotropy in the index of refraction and an at least partial alignment of the LCs—a similar effect in the appearance is created when the direction of the directional light portion 33 is varied or the polarization state is varied. Exemplary PDLC films for the angle type or polarization type tuning approaches may be based on e.g. E7 LC droplets embedded in a NOA65 or NOA1315 polymeric film.

FIGS. 17A to 17G illustrate schematic cross-sections for liquid crystal droplet based scattering units. FIG. 17H illustrates an inverted concept in which static scattering centers (nanoparticles) are embedded in a liquid crystal based host material. FIG. 17I illustrates a liquid crystal droplet based scattering unit in-between PET layers and FIG. 17J such a PET-PDLC configuration within a glass sandwich structure.

FIG. 17A illustrates again the basic setup that was already illustrated e.g. in FIG. 1A or 12A. In-between two ITO glass sheets 23—as examples of conducting and at least at one side transmitting cover layers—scattering is performed with layer 17 that comprises, as scattering elements/centers, LC nanodroplets 19 embedded within host material 21.

Figure 17A:
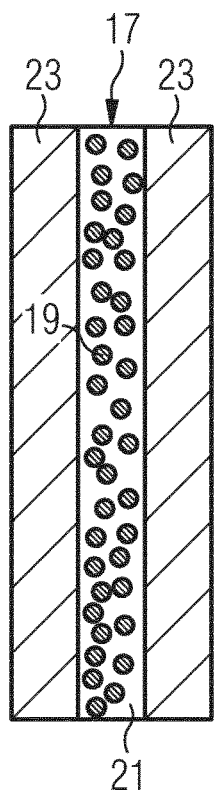
FIGS. 17A to 17J show schematic cross-sections of LC nanodroplets based layer structures.
Figure 17B:
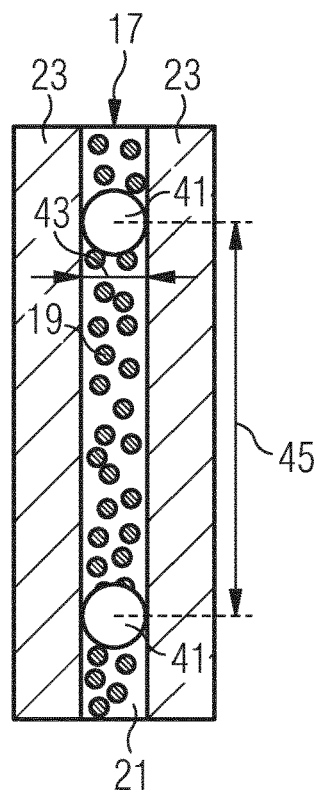

In the embodiment of FIG. 17B, spacer elements 41 are included in layer 17 to provide for a defined layer thickness 43 of layer 17 between the two, for example, rigid cover sheets. E.g. ITO glass as a cover sheet is sufficiently stiff to allow for an average distance 45 between elements that does not essentially affect the visual perception. In general, examples of spacer elements 41 include polymeric or glass beads. Moreover, a spacer grid or spacer net can be used, where the base shape is, for example, adapted to any underlying structural features of the lighting system such as of the light source. Using spacer elements 41 allows reducing the layer thickness 43 and thus lowers the voltage needed to be applied to achieve a desired electric field across layer 17 (e.g. operating with a standard 220 V AC-Voltage). Moreover, using spacer elements 41 allows an increase of the uniformity of the optical properties of layer 17 due to a more homogeneous thickness and thus scattering element distribution in the plane of layer 17. However, the density of the spacer elements 41 should be low enough so that their presence itself does not affect the visual appearance.

Figure 17C:
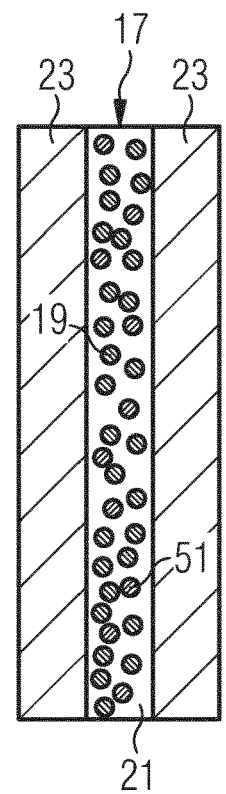

In the embodiment of FIG. 17C, "static" scattering elements 51 are included in layer 17 to provide additional scattering features that are independent of, for example, the applied electric field or the incident direction of the light. The amount of static scattering elements 51 may be, for example, selected to provide for a homogeneous scattering feature in the desired degree across the scattering unit. Static scattering elements 51 can be sized in the nanoscale to provide a constant base of Rayleigh-like scattering. Alternatively or additionally, static scattering elements 51 can be sized in e.g. the microscale to provide a large particle diffuse scattering for smearing out any structure of the light intensity distribution across the "to be scattered" light beam, thereby in particular enforcing the full width at half maximum (e.g. larger than 10°) of the luminous intensity distribution curve of the divergent illumination of the illumination device, e.g. in a rotational symmetric manner. In general, examples of static scattering elements 51 include organic or inorganic particles.

Figure 17D:
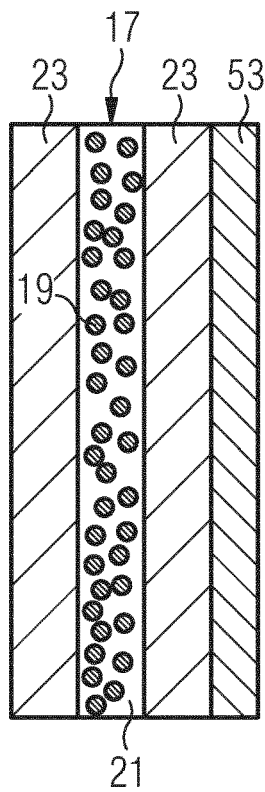

An alternative approach for providing additional static scattering features is illustrated in FIG. 17D. Specifically, an e.g. diffusing layer 53 is added to the outer surface of one of the cover sheets (or to both cover sheets—or as a separate layer in-between—or with different scattering features within one or separate diffusing layers). For example, diffusing layer 53 may provide a constant base of Rayleigh scattering and/or a large particle diffuse scattering similar to the embodiment of FIG. 17C, using e.g. respective static scattering elements 51 embedded in a supporting matrix. In some embodiments, diffusing layer 53 can further comprise a holographic diffuser, a microlens diffuser, or a microlens homogenizer. In general, diffusing layer 53 can be passed by the light before or after interacting with the scattering layer.

Figure 17E:
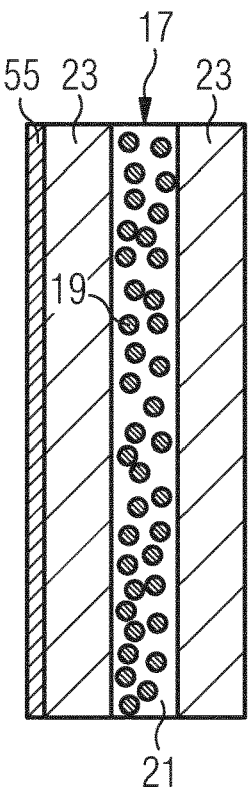
Figure 17F:
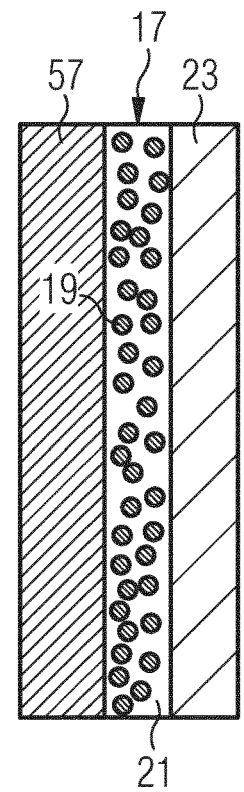

While the embodiments of FIGS. 17A to 17D are intendent to be used in transmission, the embodiment of FIGS. 17E and 17F are used in reflective configurations such as shown in FIG. 5 or 7. For example, as schematically illustrated in FIG. 17E, a reflective layer 55 is provided at one of the cover sheets. Accordingly, light impinging on the other cover sheet will pass twice through layer 17, once before and once after reflection at reflective layer 55.

In the embodiment of FIG. 17F, one of the cover sheets is configured itself as a reflective sheet 57. In that case, reflective sheet 57 may be further configured to act as an areal electrical contact. This can in particular be implemented in metallic CPC-structures.

Figure 17G:
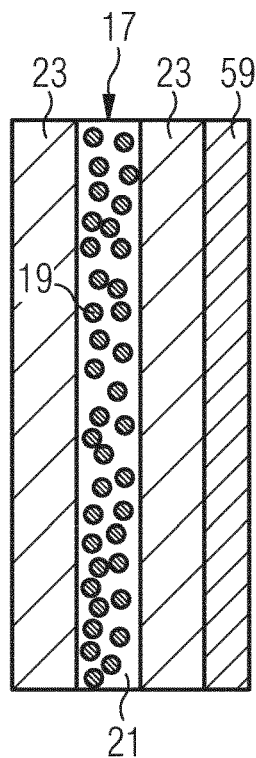
Figure 17H:
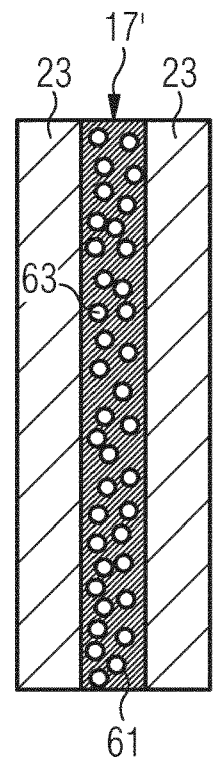
Figure 17I:
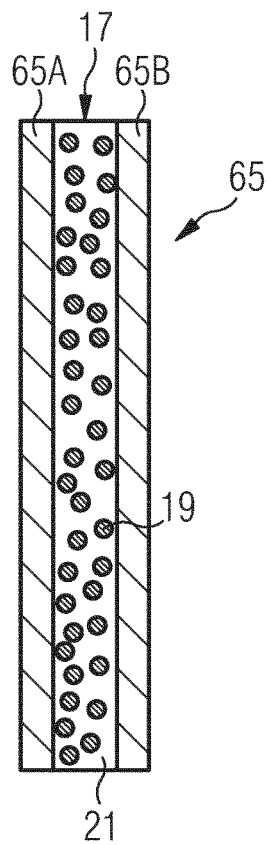

In the embodiment of FIG. 17G, an absorbing layer 59 is added to the outer surface of one of the cover sheets (or at both cover sheets or as a separate layer in-between or with different absorbing features within one or separate diffusing layers). For example, absorbing layer 59 may provide UV and/or IR absorption. Respective scattering units may in particular be suited for use outside. In addition, it is possible to introduce UV and/or IR absorbing species directly in the starting mixture of pre-polymer and LCs.

While the embodiments of FIGS. 17A to 17G are based on providing the LCs in nanodroplets, the embodiment of FIG. 17H provides the LCs in their liquid form as the host material 61 in which "static" nanoscale scatterers 63 are embedded. The optical aspects disclosed above for the LC nanodroplets similarly apply in that configuration.

Figure 17J:
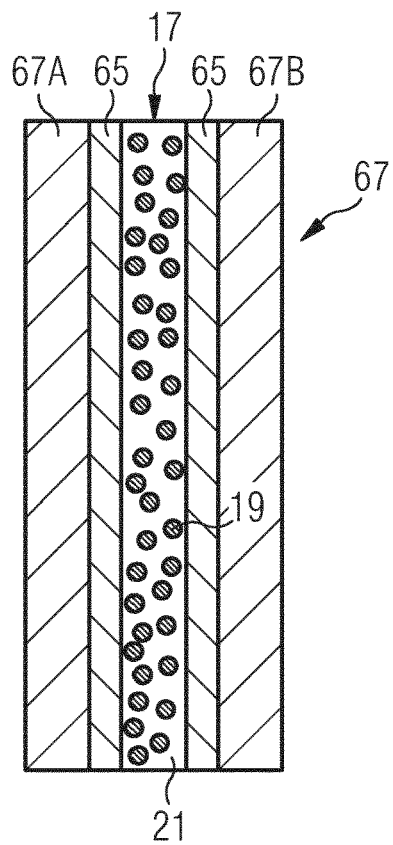

As illustrated in FIG. 17I, PET film based layer structures 65 use plastic flexible conductive transparent films (e.g. ITO PET films 65A, 65B) to define layer 17. The thickness of layer 17 may be defined by adding again, for example, some spacer elements (not shown). This may allow producing diffuser window elements 67 as shown in FIG. 17J, in which the final PDLC layer structure is a PDLC film sandwiched between two e.g. ITO PET films 65A, 65B that is then stratified between two glass sheets 67A, 67B.

The skilled person will acknowledge that the exemplary modifications of the basic setup as discussed in connection with FIGS. 17A to 17J may generally be combined to provide a combination of additional optical features (defined thickness, additional scattering, absorption, reflection) within a scattering unit. Moreover, added features may be provided by a single added element (e.g. an absorbing spacer element). Furthermore the device can have additional optical features such as etched, anti-glare, anti-reflection surface.

In general, the size of the layer structure may extend over an area associated with the collimation optics. Specifically, the area may be associated with the selected surfaces/interfaces at which scattering should take place. For a single CPC- or TIR-based collimation optics having a rectangular shaped cross-sectional output at its output side, the size of the layer structure positioned at that output region may be in the range from 1 mm×1 mm up to 10 mm×10 mm or more, e.g. up to 50 mm×50 mm or even 100 mm×100 mm. Similarly, for circularly shaped cross-sectional output, the size of the layer structure may be given by a diameter in the range from 1 mm to 50 mm (e.g. 10 mm or 25 mm) or even up to 100 mm. A layer structure extending beyond several light sources, for e.g. combined large area illumination devices based on a plurality of light sources (such as the LED panels mentioned above), the size of the layer structure may extend over a closed area of even up to e.g. 1 m×2 m or more, thereby providing a large continuously diffuse emitting area. For tile structure based illumination devices, the layer structure may extend over a closed area in the range of e.g. about 10 cm×10 cm corresponding e.g. to a single tile.

Similarly, a layer structure applied to an inner surface of a CPC may extend over an area that results from respective sizes of the CPC with e.g. the above mentioned cross-sectional output. The layer structure may thus have a size in the range from 1 mm×1 mm up to 10 mm×10 mm or 50 mm×50 mm or up to 100 mm×100 mm or 200 mm×200 mm in respective planar or non-planar shapes.

In particular referring to FIGS. 17I and 17J, ITO-PET-supporting films for sandwiching the PDLC layer can be produced with standard processes, thereby creating long rolls of film-type based material for large scale layer structures. On the other side, referring to e.g. FIG. 17A, ITO-glass sheets for sandwiching the PDLS-film can be used for smaller scale layer structures.

The formation of a polymeric network with e.g. LC nanodroplets inclusion can be achieved by means of different technique that can be adopted depending on the chemical properties of the selected materials. For further details, it is in particular referred to the above mentioned not yet published international patent application PCT/EP2017/057062, specifically the disclosure related to the embodiments discussed in connection with respective FIGS. 8 to 9B, incorporated herein by reference.

Several different types of liquid crystals (LC) can be considered suitable for the aspects disclosed herein. In principle, there is a large variety of LCs commercially available. A leading company in the LC field is Merck KGaA (Germany). Typical classes of useful liquid crystal for this invention may include but are not limited to cyanobiphenyls and fluorinated compounds. Cyanobiphenyls can be mixed with cyanoterphenyls and with various esters. A commercial example of nematic liquid crystals belonging to this class is "E7" (Licrilite® BL001 from Merck KGaA). E7 is a mixture of 51% 4'-n-pentyl n-cyanobiphenyl (5CB), 21% 4'-n-heptyl-n-cyanobiphenyl (7CB), 16% 4'-n-octoxy-4-cyanobiphenyl, 12% and 4'-n pentyl-4'-n-pentyl-4-cyanoterphenyl. The mixture has a crystal to nematic phase transition temperature of −10° C. and a nematic to isotropic transition temperature of 60° C.

Further examples of commercial liquid crystal are: E31, E44, E63 for mixtures of LCs; K12, K21, K24, M15, M18, M24 for single component LCs. Other useful examples of liquid crystal mixtures (e.g. available from Merck KGaA) include BL003, BL004, BL009, BL011, BL012, BL032, BL036, BL037, BL045, BL046, ML-1001, ML-1002, and the series of mixtures including fluorinated compound TL202, TL203, TL204, TL205, TL215, TL216 which have a remarkably high birefringence. Liquid crystals available from other companies include e.g. TOTN404 and ROTN-570 by Hoffman-LaRoche, Switzerland.

In the context of polymerization, the term "pre-polymer" refers to any kind of polymer precursor able to form a polymer as the host material of the liquid crystal droplets. It can be, for example, a monomer, an oligomer, a short chain polymer or a mixture of this three component. For TIPS and SIPS, it can also be a polymer in liquid state that it is induced to solidify. Suitable pre-polymers for the present invention are precursors able to form a polymer having excellent optical transparency. It can be selected from thermoplastic, thermosetting and photocurable resins. Suitable pre-polymers may belong (but are not limited) to the following categories: esters, aldehydes, phenols, anhydrides, epoxides, acrylates, vinyls, alkenes, alkynes, styrenes, halides, amides, amines, anilines, phenylenes, aromatic hydrocarbons, and siloxanes. In addition, fluorinated polymer precursor may be used. A wide variety of commercial useful pre-polymers are available such as adhesives of the NOA series from Norland optics Inc. and UV curable adhesives and sealants from Croda International Plc. or Henkel AG & Co. KGaA.

Referring to e.g. FIG. 12B, cover sheets provide in some embodiments an areal electrical contact as close as possible to the LC droplets. Specifically, it was exemplarily referred to ITO glass sheets 23. ITO glass sheets 23 are an example of known sheets using transparent conducting oxides (TCOs) as electrode elements, providing transmission in the visible spectrum of at least 90%. Together with the glass sheet, a structural template can be formed, which even may form a diffusion barrier. Desirable characteristics of TCO materials in the present embodiments include a high optical transmissivity across a wide spectrum, in particular the visible spectrum, and a low resistivity.

The optical features of the herein disclosed layer structures are in the following defined in connection with the E standard illuminant. Herein, as defined in the Standard Terminology of Appearance, ASTM international, E 284-09a, a spectral power distribution, SPD specifies an illuminant by the spectral composition of a radiometric quantity, such as radiance or radiant flux, as a function of wavelength. The E standard illuminant is an equal-energy radiator with a SPD that is constant inside the visible spectrum. The optical features are selected based on the various configuration and material parameters disclosed herein.

The herein disclosed layer structures—when illuminated with white light as characterized by the E standard illuminant—transmit directed light that corresponds to a color point on the CIE 1976 u'-v'-chromaticity diagram with coordinates u', v' that are larger than 0.20 and 0.465, respectively, (line u'l/v'1 in FIG. 15D) for any configuration within the chromatic tunability range of the layer structure. Moreover, in some embodiments, the Euclidean distance Δu'v' between the color point of the transmitted direct light and the Planckian locus satisfy Δu'v' is smaller than 0.1 for any configuration within the chromatic tunability range. (Schematically, the Euclidean distance δu'v' is indicated in FIG. 15D.) Moreover, the respective scattered light corresponds to a color point on the CIE 1976 u'-v'-chromaticity diagram with coordinates u', v' that are smaller than 0.20 and 0.465, respectively, (line u'l/v'1 in FIG. 15D) for any configuration within the chromatic tunability range of the layer structure. With respect to the distance between the color points associated to the scattered and transmitted light in the CIE 1976 u'-v'-chromaticity diagram, for any configuration within the chromatic tunability range of the layer structure, the Euclidean distance δu'v' between these points satisfies δu'v' is 0.02 or more. (Schematically, the Euclidean distance δu'v' is indicated in FIG. 15A.)

In particular, in some embodiments, the color point for the transmitted direct light has coordinates u', v' that are larger than 0.20 and 0.465, respectively, for the maximum scattering cross-section associated with the tuning range of the respective embodiment (line u'l/v'1 in FIG. 15D). Moreover, in some embodiments, for the maximum scattering cross-section associated with the tuning range of the respective embodiment, the color point for the transmitted direct light has coordinates u', v' that are larger than 0.2117 and 0.4851, respectively, or larger than 0.2265 and 0.5029, respectively, (e.g. beyond lines u'2/v'2 in FIG. 5D), or larger than 0.243 and 0.5166, respectively, (e.g. beyond lines u'3/v'3 in FIG. 5D) or larger than 0.2598 and 0.5261, respectively.

Moreover, the Euclidean distance Δu'v' between the color point of the transmitted direct light and the Planckian locus satisfy Δu'v' is smaller than 0.1 for any configuration within the chromatic tunability range. Moreover, the respective scattered light corresponds to a color point on the CIE 1976 u'-v'-chromaticity diagram with coordinates u', v' that are smaller than 0.20 and 0.465, respectively, (line u'l/v'1 in FIG. 15D) for any configuration within the chromatic tunability range of the layer structure. With respect to the distance between the color points associated to the scattered and transmitted light in the CIE 1976 u'-v'-chromaticity diagram, for any configuration within the chromatic tunability range of the layer structure, the Euclidean distance δu'v' between these points satisfies δu'v' is 0.02 or more.

The herein disclosed embodiments allow creating a significant redshift in the transmitted light e.g. from CCTs in the range of 5500 K (white-yellow) to CCTs in the range of 4000 K (yellow/orange) to CCTs in the range of 3000 K (reddish sun) and even further. Such a redshift requires—assuming a thickness in the range from 10 μm to 500 μm, a filling ratio in the range from 30% to 70%, and an average particle size in the nano-range from 50 nm to 300 nm—a tuning capability in the refractive index, e.g. given by a maximum index mismatch or a maximum size variation.

In the following, the optical properties described herein are linked to specific material parameters that allow describing the generic concept for specific implementations of scattering layers that can be used in layer structures for providing a chromatically tunable (for example, regular transmitted) direct light. In this context, it will be referred to FIGS. 15A to 15D and FIGS. 18 and 19. The tuning capability corresponds to a change in the transmittance of the layer structure that can be related to a specific color. This change in transmittance can be given for a light beam that does not change direction (e g tuning of individual scattering cross-section of nanodroplets by electric field changes) and/or can be achieved by a light beam's change in incident direction (e g tuning using the contributing anisotropic refractive index for aligned LCs in the nanodroplets or tuning using the contributing anisotropic shape of scattering elements).

Considering the case of Rayleigh scattering for isotropic particles, and assuming a constant, i.e. wavelength-independent, refractive index, and neglecting any absorption of light (or renormalizing the light absorption to reduce that added effect), it is possible to associate the points in the CIE 1976 color space u'1/v'1, u'2/v'2, u'3/v'3 given by the (above in connection with FIGS. 15C and 15D) mentioned u'- and v'-values 0.212/0.485, 0.225/0.5, and 0.24/0.514 to values of a regular spectral transmittance, assuming a standard illuminant E and a CIE 1931 standard observer (2°). In general, the regular spectral transmittance T(λ) is a function of the wavelength and can be measured in accordance with the NIST (National Institute of Standards and Technology) Special Publication 250-69 of the U.S. Department of Commerce Technology Administration.

The transition between a regular spectral transmittance and its associated color point on the CIE 1976 color space is a well-known procedure. For example, reference is made to the standard ASTM E 308-01, which defines the procedure for obtaining the color point given a standard illuminant and a standard observer. As a consequence, any and all the features of the layer structure described in terms of the color (expressed in CIE 1976 color coordinates) of the regular transmitted light (for illumination by a non-polarized E standard illuminant and CIE 1931 standard observer)(2°) can be equivalently described in terms of the CIE 1976 color coordinates associate to the regular spectral transmittance of the layer structure, the mapping into the same color space being performed in accordance with the procedure described in the mentioned standard practice ASTM E308-01.

For example, the regular spectral transmittance at a wavelength of 450 nm—herein referred to as T(450 nm)—for the color point u'1/v'1 relates to T1(450 nm)=0.748, for the color point u'2/v'2 to T2(450 nm)=0.437, and for the color point u'3/v'3 to T3(450 nm)=0.200.

The transmittance allows a microscopic definition. Microscopically, the regular spectral transmittance T(λ) is a function of the scattering cross-section σ of the nanoscale scattering elements and the number of nanoscale scattering elements per unit area N, which is the product of the (three-dimensional) number density and the layer thickness. The regular spectral transmittance T(λ) is given by $$T(\lambda) = e^{-\sigma(\lambda, n_h, m, d) \cdot N}$$

Therein, the Rayleigh scattering cross section σ is—as given above—

$$\sigma(\lambda) = \frac{2}{3}\pi^5 \frac{D^6}{n_h^2 \lambda^4} \left( \frac{m^2 - 1}{m^2 + 2} \right)^2$$

with the refractive index of the host material $n_h$, effective particle diameter $D = d \, n_h$, and the relative refractive index m.

Considering the regular spectral transmittance T(450 nm) and the two equations above, for 450 nm, the number of nanoscale scattering elements per unit area N is given by $$N = c \cdot \frac{n_h^2}{D^6} \left( \frac{m^2 + 2}{m^2 - 1} \right)^2$$

where for a fixed value of T, the constant c is given by $$c = \ln\left( \frac{1}{T(450 \text{ nm})} \right) \cdot \frac{3}{2\pi^5} \cdot (450 \text{ nm})^4$$

From those equations, the relation between N and T is clear. In particular, it is possible to associate the number N of nanoscale scattering elements per unit area to a value of T(450 nm) and then to a u'-v'-point as a function of material features such as d, $n_h$ and m.

Specifically, for the color point u'1/v'1, the number N1 of nanoscale scattering elements per unit area is $$N_1 = 5.836 \times 10^7 \text{ nm}^4 \cdot \frac{n_h^2}{D^6} \left( \frac{\tilde{m}^2 + 2}{\tilde{m}^2 - 1} \right)^2$$

with constant c1_transmission=2×2.918×10⁷ nm⁴.

For the color point u'2/v'2, the number N2 of nanoscale scattering elements per unit area is $$N_2 = 1.664 \times 10^8 \text{ nm}^4 \cdot \frac{n_h^2}{D^6} \left( \frac{\tilde{m}^2 + 2}{\tilde{m}^2 - 1} \right)^2$$

with constant c2_transmission=2×8.32×10⁷ nm⁴.

For the color point u'3/v'3 points, the number N3 of nanoscale scattering elements per unit area is $$N_3 = 3.235 \times 10^8 \text{ nm}^4 \cdot \frac{n_h^2}{D^6} \left( \frac{\tilde{m}^2 + 2}{\tilde{m}^2 - 1} \right)^2$$

with constant c3_transmission=2×1.6175×10⁸ nm⁴.

At this stage it is noted—with reference to the two classes of configurations "transmitting" (e.g., FIG. 1) or "reflective" (e.g., FIG. 5)—that the optical activity of a scattering layer can be doubled if used in the reflective configuration. Therefore, to achieve the same chromatic effect in reflection mode only half of the number of nanoscale scattering elements per unit area is needed that is required in transmission mode. The values identified above for the constant c were derived for the transmission mode (c_transmission) such that in reflection mode, the half of those values apply to c_reflection. Accordingly, c_transmission equals 2×c_reflection, such that a factor of two "2" separated from the above values.

Based on the constants c_transmission (c_reflection), for a specific host material with refractive index $n_h$, the individual number of nanoscale scattering elements per unit area is a function of the parameters D and $\tilde{m}$, which have to be chosen to reach the final (desired chromatic) effect.

Referring to the above identified values/color points, the associated (optically) effective number of nanoscale scattering elements per unit area is $\tilde{N} \geq N_1$, such as $\tilde{N} \geq N_2$, such as $\tilde{N} \geq N_3$, wherein $\tilde{N} \equiv N$ if the diffused unit does not comprise a reflective layer or a reflective sheet side and wherein $$\tilde{N} \equiv \frac{N}{2}$$

if the diffused unit comprises a reflective layer or a reflective sheet.

For example, the number N of nanoscale scattering elements per unit area associated to a specific color point in the u'-v'-chromaticity diagram can be determined for LC nanodroplets embedded in a polymeric matrix with parameters in the following range:

0.02≤|n_e−n_o|≤0.5 d being in the range from about 10 nm to about 500 nm such as in the range from about 20 nm to about 400 nm such as in the range from about 30 nm to about 300 nm $n_h$ being in the range from 1 to 3 such as in the range from 1.2 to 2.2 such as in the range from 1.25 to 1.75

$\tilde{m}$ being the one among the two values $$\frac{n_o}{n_h} \text{ and } \frac{n_e}{n_h}$$

which maximizes the function $$\left( \frac{m^2 - 1}{m^2 + 2} \right)^2$$

the minimum number N of nanodroplets per unit area of the scattering layer, in particular of the surface of the scattering layer, by $$N = c \cdot \frac{n_h^2}{D^6} \left( \frac{\tilde{m}^2 + 2}{\tilde{m}^2 - 1} \right)^2$$

and c being a respectively selected constant

Similarly, in the inverted concept, in which static scattering centers (nanoparticles) are embedded in a LC-based host material, the number N of nanoscale scattering elements per unit area associated to a specific color point in the u'-v'-chromaticity diagram can be determined with parameters in the following range:

$n_h$ (refractive index of the LC host material) where 0.02≤|n_e−n_o|≤0.5 d of the nanoscale scattering elements being in the range from about 10 nm to about 500 nm such as in the range from about 20 nm to about 400 nm such as in the range from about 30 nm to about 300 nm np (refractive index of the static scattering center) being in the range from 1 to 3 such as in the range from 1.1 to 3.2 such as in the range from 1.2 to 3 such as in the range from 1.3 to 2.8 a maximizing refractive index of the liquid crystal host material $\tilde{n}_h$ having a value between $n_o$ and $n_e$ wherein the liquid crystals have an anisotropy in the range of 0.02≤|n_e−n_o|≤0.5, wherein $\tilde{n}_h$ is the value, which maximizes the function $$\frac{1}{n_h^2} \left( \frac{m^2 - 1}{m^2 + 2} \right)^2$$

the minimum number N of static scattering centers per unit area of the scattering layer, in particular of the surface of the scattering layer, given by $$N = c \cdot \frac{\tilde{n}_h^2}{D^6} \left( \frac{\hat{m}^2 + 2}{\hat{m}^2 - 1} \right)^2$$

wherein $$\hat{m} = \frac{n_p}{\tilde{n}_h}$$

and c being a respectively selected constant.

Figure 18:
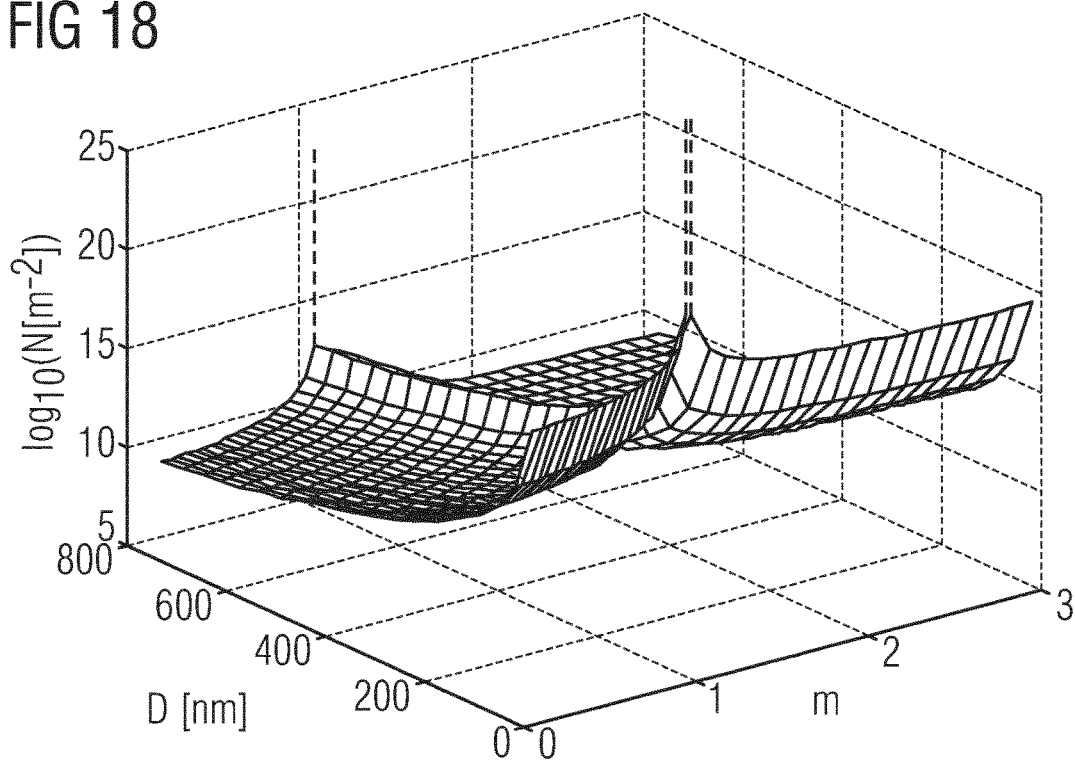
FIG. 18 is an exemplary three-dimensional graph of the minimum number N of nanoscale scattering elements per unit area.

In FIG. 18, a three-dimensional graph of the function log 10(N), with N in units m^−2, is shown as a function of D and m, assuming a host material of nh=1.5396 (corresponding exemplarily to NOA65 as a host material), calculated for a wavelength of 450 nm and using the approximation of a Rayleigh scattering formula for a regular spectral transmittance of T=0.748 at wavelength 450 nm.

As shown in FIG. 18, there is an increase in the number of needed nanoscale scattering elements for decreasing D, which is in particular significant for small particles. Moreover, in FIG. 18, there is a divergence approaching the plane at m=1 because for m=1, the scattering cross section sigma goes to 0 (corresponding to the transmission mode discussed above e.g. in connection with FIG. 13).

Any parameter constellation resulting in values on or above the surface will relate to color points on color point u'1/v'1 or having u'- and/or v'-values larger than or equal to u'1 and v'1. Similar surfaces can be determined for e.g. color point u'2/v'2 (T2(450 nm)=0.437), and for the color point u'3/v'3 (T3(450 nm)=0.200).

Figure 19:
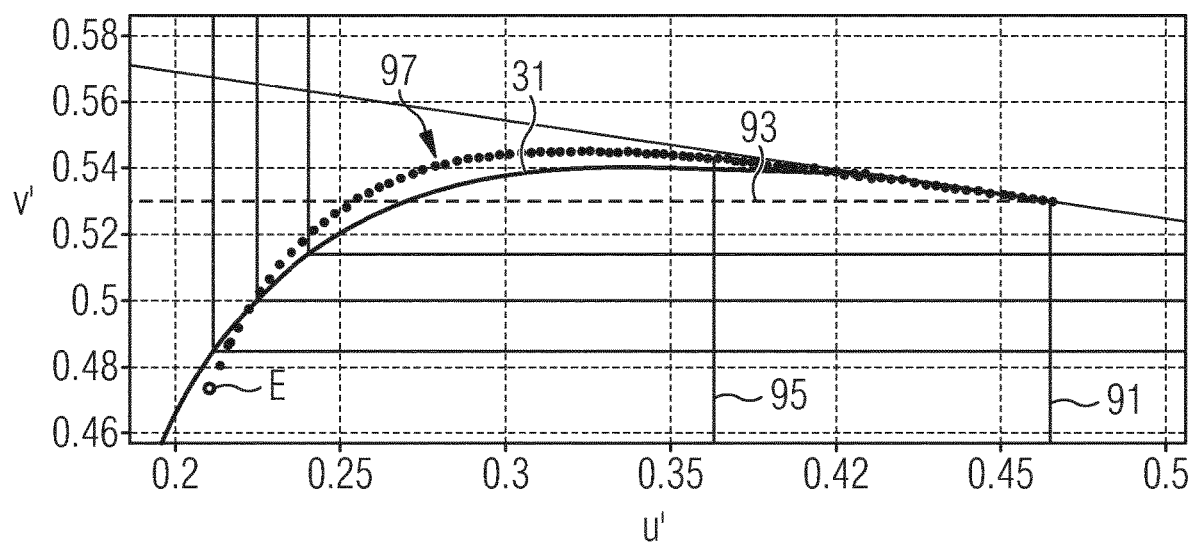
FIG. 19 shows a schematic uniform chromaticity diagram for illustrating upper values for the number N of nanoscale scattering elements per unit area.

Referring to FIG. 19 and dichroic illumination, ensuring proper sun-like illumination with e.g. a dark red sunlight, upper limits for the number N of nanoscale scattering elements per unit area can be determined. Similarly, respective lower limits for the regular spectral as well as total transmittance can be derived. Specifically, a regular spectral transmittance corresponding to a u' value of 0.465 (line 91 in FIG. 19), assuming a host material of nh=1.5396 (corresponding exemplarily to NOA65 as a host material, calculated for a wavelength of 450 nm and using the approximation of a Rayleigh scattering formula), (note that limiting v' would exclude a part of the Planckian locus 31 as indicated by dashed line 93 in FIG. 17) features transmittances of T(450 nm)=$5.410\times10^{-8}$, T(650 nm)=0.02. The resulting constant c, which is related to that N(max) value, is equal to $3.363\times10^9$ nm$^4$.

Assuming a u'-value of 0.3605 (line 95 in FIG. 17), there result transmittances of T(450 nm)=$2.724\times10^{-4}$, T(650 nm)=0.150. The respective resulting constant c, which is related to that N(max) value, is equal to $1.6499\times10^9$ nm$^4$.

In addition, a dotted line 97 of color points is indicated in FIG. 19, illustrating the tuning of a color of the regularly transmitted light—and respectively, the associated change in transmittance. For completeness, also the u'-v'-values for the three above discussed color points are shown.

In other words, the herein disclosed layer structure represent a material composition that can be switched between diffusing states such as from a high transparency state to a high diffusing state. The layer structure is additionally a chromatically selective filter that diffuses light with a frequency dependence without reducing the clarity of the perceived image.

In some embodiments, multiple areal electric contact regions may be provided across, in particular large area a scattering unit. Each electric contact region may allow setting a desired electric field by applying a respective voltage across respective areal electric contacts. If, for example, features of the direct light vary across the illuminated scattering unit (such as the incident angle, the radiant flux or the spectrum), the respective selected voltage parameters can be adapted accordingly. Moreover, different regions may be controlled e.g. to provide a variation in the color across the scatterer unit.

As used herein, directed, direct, and (regularly) transmitted light may—depending on the context—be equivalent in meaning. Moreover, the transparency of the areal electrical contact in the visible wavelength range is preferably at least 80%, in particular at least 90% such as even 95% or 99% or more. Similarly, the transparency of the scattering layer in the visible wavelength range is preferably at least 80%, in particular at least 90% such as even 95% or 99% or more.

Herein, as defined in the Standard Terminology of Appearance, ASTM international, E 284-09a, the total transmittance is in general the ratio of the flux transmitted at all forward angles to the incidence flux.

Herein, as defined in the Standard Terminology of Appearance, ASTM international, E 284-09a, the total reflectance is in general the ratio to the incident flux of the radiant or luminous flux reflected at all angles within the hemisphere bounded by the plane of measurement.

Herein, as defined in the Standard Terminology of Appearance, ASTM international, E 284-09a, the absorption is the transformation of radiant energy to a different form of energy by interaction with matter.

In the following, various aspects are summarized:

Aspect 1A. An illumination device (165B) for providing a light emission through an output aperture, the illumination device (165B) comprising:
- a plurality of light sources (103A) spatially distributed on a two-dimensional board (111'), each light source configured for emitting light in a visible spectrum;
- an output aperture, through which the light emitted from the plurality of light sources (103A) exits the illumination device (165B);
- a layer structure (107) comprising
  - a scattering layer (17) of a plurality of nanoscale scattering elements (19, 63) embedded in a host material (21, 61) and positioned in an optical path of the light emitted from the plurality of light sources (103A), wherein the optical path extends between the plurality of light sources (3) and the output aperture, and
  - a pair of areal electrical contact layers (23'), wherein the areal electrical contact layers (23') extend at opposite sides of the scattering layer (17) and are electrically connectable with a power source to generate an electric field (27) across the scattering layer (17) (in particular for influencing scattering properties of the scattering layer (17)).

Aspect 1B. An illumination device (165A) for providing a light emission through an output aperture, the illumination device (165A) comprising:
- a plurality of light sources (103A) for emitting light in a visible spectrum;
- a two-dimensional light guide system receiving light from the plurality of light sources (103A) and emitting the light from a plurality of light emitting regions;
- an output aperture, through which the light emitted from the plurality of light emitting regions exits the illumination device (165A);
- a layer structure (107) comprising
  - a scattering layer (17) of a plurality of nanoscale scattering elements (19, 63) embedded in a host material (21, 61) and positioned in an optical path of the light emitted from the plurality of light sources (103A), wherein the optical path extends between the plurality of light sources (103A) and the output aperture, and
  - a pair of areal electrical contact layers (23'), wherein the areal electrical contact layers (23') extend at opposite sides of the scattering layer (17) and are electrically connectable with a power source to generate an electric field (27) across the scattering layer (17) (in particular for influencing scattering properties of the scattering layer (17)).

Aspect 1C. An illumination device (100A-100F) for providing a light emission through an output aperture (101), the illumination device (100A-100F) comprising:
- a light source (103) for emitting light in a visible spectrum;

an output aperture (101), through which the light emitted from the light source (3) exits the illumination device (100A-100F);

a collimation optics (105) configured for redirecting at least part of the light emitted from the light source (3) through the output aperture (101); and a layer structure (107) comprising a scattering layer (17) of a plurality of nanoscale scattering elements (19, 63) embedded in a host material (21, 61) and positioned in an optical path of the emitted light that extends between the light source (3) and the output aperture (101), and a pair of areal electrical contact layers (23'), wherein the areal electrical contact layers (23') extend at opposite sides of the scattering layer (17) and are electrically connectable with a power source to generate an electric field (27) across the scattering layer (17).

Aspect 1D. An illumination device (100A-100F) for providing a light emission through an output aperture (101), the illumination device (100A-100F) comprising:

a light source (103) for emitting light in a visible spectrum;

an output aperture (101), through which the light emitted from the light source (3) exits the illumination device (100A-100F);

a collimation optics (105) configured for redirecting at least part of the light emitted from the light source (3) through the output aperture (101); and a layer structure (107) comprising a scattering layer (17) of a plurality of nanoscale scattering elements (19, 63) embedded in a host material (21, 61) and positioned in an optical path of the emitted light that extends between the light source (3) and the output aperture (101), and a pair of areal electrical contact layers (23'), wherein the areal electrical contact layers (23') extend at opposite sides of the scattering layer (17) and are electrically connectable with a power source to generate an electric field (27) across the scattering layer (17), wherein the dimension of the output aperture (101) can be characterized by a diameter (D101) being smaller than 95 mm, such as less than 80 mm, or even less than 50 mm for a circular output aperture. For non-circular output apertures, a diameter of a circle encompassing the output aperture (or encompassing the total active area of the collimation optics) may be used to define the dimension of the output aperture, wherein the diameter is smaller than 95 mm, such as less than 80 mm, or even less than 50 mm for a circular output aperture. Moreover, the area of the output aperture can be used to characterize the dimension of the output aperture (101).

In some illumination devices, the wavelength dependent ensemble light scattering cross-section amount ($\sigma_{total}$) is given by a specific selection of properties of the scattering layer (17), which affect its optical properties, including:

a refractive index of the nanoscale scattering elements (19, 63), in particular an anisotropy in the refractive index and/or a refractive index of constituting matter of the nanoscale scattering elements (19, 63), a size and/or a shape of the nanoscale scattering elements (19, 63), a refractive index of the host material (21, 61), in particular an anisotropy in the refractive index and/or a refractive index of constituting matter of the host material (21, 61), a volume fraction between the nanoscale scattering elements (19, 63) and the host material (21, 61), and/or a layer thickness of the scattering layer (17).

In some illumination devices, a mean size of the nanoscale scattering elements (19, 63) is in the range from about 10 nm to about 500 nm such as in the range from about 20 nm to about 400 nm such as in the range from about 30 nm to about 300 nm, and/or a volume fraction between the nanoscale scattering elements (19, 63), in particular between liquid crystal droplets, and the host material (21, 61) is in the range from about 30% to about 70% such as in the range from about 40% to about 60%, and/or a layer thickness of the scattering layer (17) is in the range from about 10 μm to about 500 μm such as in the range from about 20 μm to about 350 μm, e.g. in the range from about 30 μm to about 200 μm or even in the range from about 50 μm to about 100 μm, and optionally the layer thickness is defined by spacer elements (41) and/or has a variation in thickness less than 10% across an area of 10 cm×10 cm of the scattering layer (17).

In some illumination devices, a droplet diameter d is in the range from about 10 nm to about 500 nm such as in the range from about 20 nm to about 400 nm such as in the range from about 30 nm to about 300 nm, the liquid crystals has an anisotropy in the range of $0.02 \leq |n_e - n_o| \leq 0.5$, and the polymeric host material (21, 61) separating the nanoscale scattering elements (19) has a host refractive index $n_h$ in the range from 1 to 3 such as in the range from 1.2 to 2.2 such as in the range from 1.25 to 1.75; and wherein the maximizing relative refractive index $\tilde{m}$ is the one among the two values $$\frac{n_o}{n_h} \text{ and } \frac{n_e}{n_h},$$

which maximizes the function $$\left(\frac{m^2 - 1}{m^2 + 2}\right)^2,$$

and wherein the droplet size, the host refractive index, and the maximizing relative refractive index, and a constant c define the minimum number N of nanodroplets per unit area of the scattering layer (17), in particular of the surface of the scattering layer (17), by $$N = c \cdot \frac{n_h^2}{D^6} \left(\frac{\tilde{m}^2 + 2}{\tilde{m}^2 - 1}\right)^2,$$

for the constant c being $2.918 \times 10^7$ nm$^4$ or larger, in particular
$8.32 \times 10^7$ nm$^4$ or larger, such as
$1.6175 \times 10^8$ nm$^4$ or larger.

In some illumination devices,
the scattering layer (17) is configured as
  a liquid crystal layer (61) with liquid crystals having an anisotropy in the index of refraction, and
  a plurality of nanoscale scattering elements (63) embedded in the liquid crystal layer (61) and having a refractive index.

In some illumination devices,
the static scattering centers have a diameter d in the range from about 10 nm to about 500 nm such as in the range from about 20 nm to about 400 nm such as in the range from about 30 nm to about 300 nm,
a refractive index $n_p$ of the static scattering centers is in the range from 1.1 to 3.2 such as in the range from 1.2 to 3 such as in the range from 1.3 to 2.8, and
a maximizing refractive index of the liquid crystal host material $\widetilde{n_h}$ has a value between $n_o$ and $n_e$ wherein the liquid crystals have an anisotropy in the range of $0.02 \leq |n_e - n_o| \leq 0.5$; and
wherein $\widetilde{n_h}$ is the value, which maximizes the function $$\frac{1}{n_h^2}\left(\frac{m^2-1}{m^2+2}\right)^2,$$

and wherein droplet size, the maximizing host refractive index, the static scattering centers refractive index, and a constant c define the minimum number N of static scattering centers per unit area of the scattering layer (17), in particular of the surface of the scattering layer (17), by $$N = c \cdot \frac{\widetilde{n_h}^2}{D^6}\left(\frac{\hat{m}^2+2}{\hat{m}^2-1}\right)^2$$

wherein $$\hat{m} = \frac{n_p}{\widetilde{n_h}},$$

for the constant c being
$2.918 \times 10^7$ nm$^4$ or larger, in particular
$8.32 \times 10^7$ nm$^4$ or larger, such as
$1.6175 \times 10^8$ nm$^4$ or larger.

In some illumination devices,
the constant c is
equal to or larger than $5.836 \times 10^7$ nm$^4$, in particular
equal to or larger than $1,664 \times 10^7$ nm$^4$, such as
equal to or larger than $3.235 \times 10^8$ nm$^4$,
and/or
wherein the constant c is
equal to or smaller than $3.363 \times 10^9$ nm$^4$, in particular
equal to or smaller than $2.5 \times 10^9$ nm$^4$, such as
equal to or smaller than $1.6499 \times 10^9$ nm$^4$.

In some illumination devices,
the wavelength dependent ensemble light scattering cross-section amount ($\sigma_{total}$) in the blue (such as in the wavelength interval 440 nm to 460 nm) is larger than in the yellow (such as in the wavelength interval 540 nm to 560 nm), in particular it is at least about 15%, such as at least about 30% larger, and the wavelength dependent ensemble light scattering cross-section amount ($\sigma_{total}$) in the yellow (such as in the wavelength interval 540 nm to 560 nm) is larger than in the red (such as in the wavelength interval 640 nm to 660 nm), in particular it is at least about 10%, such as at least about 20% larger, and/or
wherein the wavelength dependent ensemble light scattering cross-section amount ($\sigma_{total}$) decreases with increasing the wavelength, e.g. it decreases monotonically at increasing the wavelength, i.e. $\sigma(\lambda_1) < \sigma(\lambda_2)$ for $\lambda_1 > \lambda_2$].

In some illumination devices,
the optical parameters of the scattering layer (17) are selected such that without an applied electric field, the white light passing through the scattering layer (17) is separated in a warmer regularly transmitted light portion (in particular having a lower CCT) and a colder diffused light portion (in particular having a higher CCT, e.g. at least 1.1 times, preferentially 1.2 times, more preferentially 1.5 times more than the lower CCT).

In some embodiments, the illumination device further comprises a housing only enclosing a (single) light source, a (single) collimation optics associated with that (single) single light source. In further developments, also a layer structure specifically associated with the (single) light source, and/or the (single) collimation optics may be enclosed. Alternatively, a layer structure specifically associated with the housing may be positioned inside or outside of an opening of the housing through which the light forming the divergent illumination exits the housing.

In some embodiment the housing may enclose a one or more light sources, and collimation optical elements associated to the light sources, whereby the housing comprises an opening through which the light forming the divergent illumination exits the housing and the size of the opening may be, for a rectangular shaped opening, in the range from 1 mm×1 mm up to 10 mm×10 mm or more, e.g. up tp 50 mm×50 mm or even 100 mm×100 mm, or alternatively for circularly shaped opening, the diameter of the opening may be in the range from 1 mm to 50 mm (e.g. 10 mm or 25 mm) or even up to 100 mm. Similarly, the area of the opening may be in the range from 1 mm2 up to 100 mm2 or 250 mm2 or up to 10000 mm2.

Although the preferred embodiments of this invention have been described herein, improvements and modifications may be incorporated without departing from the scope of the following claims.

The invention claimed is:

1. An illumination device for providing a divergent illumination, the illumination device comprising:
  a light source configured to emit light in a visible spectrum;
  an output aperture through which the light emitted from the light source exits the illumination device; and
  a layer structure comprising
    a scattering layer of a plurality of nanoscale scattering elements embedded in a host material and positioned in an optical path of the emitted light that extends between the light source and the output aperture, wherein the scattering layer is configured as a polymer dispersed liquid crystal layer with liquid crystals embedded as the nanoscale scattering elements in a host polymer as the host material, wherein the liquid crystals form nanodroplets, are separated by the polymer, and have an anisotropy in the index of refraction, and a pair of areal electrical contact layers, wherein the areal electrical contact layers extend at opposite sides of the scattering layer and are electrically connectable with a power source to generate an electric field across the scattering layer, wherein the divergent illumination is characterized by at least one luminous intensity distribution curve having a full width at half maximum of at least 30° and wherein a droplet diameter d is in the range from about 10 nm to about 500 nm, the liquid crystals has an anisotropy given for an ordinary refractive index $n_o$ associated with linear polarization states orthogonal to an optical axis, and an extraordinary refractive index $n_e$ with linear polarization states parallel to the optical axis in the range of $0.02 \leq |n_e - n_o| \leq 0.5$, and the polymeric host material separating the nanoscale scattering elements has a host refractive index $n_h$ in the range from 1 to 3; and wherein the maximizing relative refractive index $\tilde{m}$ is the one among the two values $$\frac{n_o}{n_h} \text{ and } \frac{n_e}{n_h},$$

which maximizes the function $$\left(\frac{m^2 - 1}{m^2 + 2}\right)^2,$$

and wherein an effective particle diameter $D = d \, n_h$, given for the droplet diameter d, the host refractive index $n_h$, and the maximizing relative refractive index $\tilde{m}$, and a constant c define the minimum number N of nanodroplets per unit area of the scattering layer by $$N = c \cdot \frac{n_h^2}{D^6} \left(\frac{\tilde{m}^2 + 2}{\tilde{m}^2 - 1}\right)^2,$$

for the constant c being at least $2.918 \times 10^7$ nm$^4$.

2. The illumination device of claim 1, wherein the droplet diameter d is in the range from about 20 nm to about 400 nm or in the range from about 30 nm to about 300 nm.

3. The illumination device of claim 1, wherein the host refractive index $n_h$ is in the range from 1.2 to 2.2 or in the range from 1.25 to 1.75.

4. The illumination device of claim 1, wherein the constant c is at least $8.32 \times 10^7$ nm$^4$ or at least $1.6175 \times 10^8$ nm$^4$.

5. The illumination device of claim 1, wherein the constant c is equal to or larger than $5.836 \times 10^7$ nm$^4$ or equal to or larger than $1,664 \times 10^8$ nm$^4$ or equal to or larger than $3.235 \times 10^8$ nm$^4$, and/or wherein the constant c is equal to or smaller than $3.363 \times 10^9$ nm$^4$ or equal to or smaller than $2.5 \times 10^9$ nm$^4$ or equal to or smaller than $1.6499 \times 10^9$ nm$^4$.

6. An illumination device for providing a divergent illumination using the Rayleigh or Rayleigh-like scattering regime, the illumination device comprising:

a light source configured to emit light in a visible spectrum;

an output aperture, through which the light emitted from the light source exits the illumination device; and a layer structure comprising a scattering layer of a plurality of nanoscale scattering elements embedded in a host material and positioned in an optical path of the emitted light that extends between the light source and the output aperture, wherein the scattering layer is configured as a polymer dispersed liquid crystal layer with liquid crystals embedded as the nanoscale scattering elements in a host polymer as the transparent host material, wherein the liquid crystals form nanodroplets with a mean size in the range from about 10 nm to about 500 nm, are separated by the polymer, have an anisotropy in the index of refraction, and are dispersed in the transparent host material to thereby act as scattering centers for Rayleigh or Rayleigh-like scattering, and a pair of areal electrical contact layers, wherein the areal electrical contact layers extend at opposite sides of the scattering layer and are electrically connectable with a power source to generate an electric field across the scattering layer, wherein the divergent illumination is characterized by at least one luminous intensity distribution curve having a full width at half maximum of at least 30°.

7. The illumination device of claim 6, wherein the light source emits light with at least one luminous intensity distribution curve having a full width at half maximum of at least 30°, as the basis of the at least one luminous intensity distribution curve of the divergent illumination of the illumination device, or the light source emits diffuse light that has an essentially Lambertian luminous intensity distribution, directly towards the layer structure, and/or wherein the layer structure comprises a diffusing layer configured to diffuse the light from the light source to generate at least one luminous intensity distribution curve having the full width at half maximum of at least 30°, as the basis of the at least one luminous intensity distribution curve of the divergent illumination of the illumination device.

8. The illumination device of claim 6, wherein the illumination device further comprises a collimation optics configured for redirecting at least part of the light emitted from the light source through the output aperture, wherein the collimation optics is configured to generate at least one luminous intensity distribution curve having the full width at half maximum of at least 30°, as the basis of the at least one luminous intensity distribution curve of the divergent illumination of the illumination device.

9. The illumination device of claim 8, wherein a direction, in which the output luminous intensity of the light exiting the output aperture is maximal, defines an output direction, and wherein the collimation optics comprises a total active area, that is defined by a projection of surface(s) and/or interface(s) interacting with the light of the light source onto a plane extending transversal to the output direction, that is at least 0.3, at least 0.5, or even at least 0.7 times an assigned area of the output aperture, that is defined by a projection of the output aperture or the portion of the output aperture associated with the respective collimation optics onto a plane extending transversal to the output direction.

10. The illumination device of claim 8, wherein the layer structure is provided on a transmitting or reflecting surface or interface of the collimation optics, the light source, or an optical window covering the output aperture, and/or wherein the layer structure is a film or a coated layer.

11. The illumination device of claim 6, wherein at least one of the areal electrical contact layers is configured to be transparent in the visible wavelength range; and/or one of the areal electrical contact layers is configured to be reflective, or forms a reflective interface of the collimation optics.

12. The illumination device of claim 8, wherein the illumination device is configured such that the light downstream the output aperture comprises a direct light beam comprising light propagating within an angular range given by the full width at half maximum of the luminous intensity distribution curve of the divergent illumination of the illumination device and/or defined by the collimation optics, and diffuse light originating from scattering of the light emitted from the light source at the nanoscale scattering elements of the scattering layer.

13. The illumination device of claim 6, wherein the scattering layer has a wavelength dependent ensemble light scattering cross-section amount ($\sigma_{total}$) within the visible wavelength range that depends on a relative refractive index between the nanoscale scattering elements and the host material associated to an illumination direction.

14. The illumination device of claim 13, wherein the scattering layer is configured to be adaptable in the ensemble light scattering cross-section amount ($\sigma_{total}$) by setting a strength of the electric field, thereby varying the relative refractive index and/or thereby providing a changeability in the spectra of the direct light beam portion and the diffuse light portion.

15. The illumination device of claim 6, wherein the light source comprises at least one light-emitting diode mounted on an LED-board, and/or the light source comprises a 1D or 2D array of light-emitting diodes.

16. The illumination device of claim 8, wherein the collimation optics is configured to redirect the light of the light source by reflection at a reflective surface, and the collimation optics comprises a total-internal reflection-lens or a compound parabolic concentrator.

17. The illumination device of claim 13, further comprising a controllable power unit that is electrically in contact with the pair of areal electrical contacts, and that is configured to adapt the electrical field across the scattering layer, thereby controlling the ensemble light scattering cross-section amount ($\sigma_{total}$).

18. The illumination device of claim 6, wherein the liquid crystal nanodroplets are dispersed in the transparent host material in a number N per unit area to thereby achieve the Rayleigh or Rayleigh-like scattering.

19. The illumination device of claim 6, wherein the liquid crystal nanodroplets dispersed in the transparent host material are provided to act as transparent nanoscale scattering elements.

20. The illumination device of claim 6, wherein an output aperture of the illumination device is given by an area from which light exits the illumination device, and a dimension of the output aperture is given for a circular output aperture by a diameter being less than 95 mm, less than 80 mm, or less than 50 mm and, for a non-circular output aperture, by a diameter of a circle encompassing the output aperture being less than 95 mm, less than 80 mm, or less than 50 mm.

21. The illumination device of claim 6, wherein an output aperture of the illumination device is given by an area from which light exits the illumination device, and the output aperture extends over an area smaller than or equal to 10000 mm$^2$, smaller than or equal to 9000 mm$^2$, smaller than or equal to 6400 mm$^2$, or smaller than or equal to 2500 mm$^2$.

22. The illumination device of claim 6, wherein the full width at half maximum of at least 30° is given in any azimuthal direction.

* * * * *